US011076940B2

(12) United States Patent
Tweedie et al.

(10) Patent No.: US 11,076,940 B2
(45) Date of Patent: Aug. 3, 2021

(54) CLEANING APPLIANCE

(71) Applicant: Dyson Technology Limited, Wiltshire (GB)

(72) Inventors: Robert Lawrence Tweedie, Swindon (GB); Timothy Nicholas Stickney, Gloucester (GB); Christopher Graham Vincent, Swindon (GB); Alan Harold Henry Mole, Gloucester (GB); Stephen Benjamin Courtney, Gloucester (GB)

(73) Assignee: Dyson Technology Limited, Wiltshire (GB)

(*) Notice: Subject to any disclaimer, the term of this patent is extended or adjusted under 35 U.S.C. 154(b) by 559 days.

(21) Appl. No.: 15/802,884

(22) Filed: Nov. 3, 2017

(65) Prior Publication Data

US 2018/0125624 A1 May 10, 2018

(30) Foreign Application Priority Data

Nov. 4, 2016 (GB) ..................................... 1618630

(51) Int. Cl.
*A61C 17/36* (2006.01)
*A61C 17/02* (2006.01)
(Continued)

(52) U.S. Cl.
CPC .............. *A61C 17/36* (2013.01); *A46B 13/04* (2013.01); *A46B 15/0004* (2013.01);
(Continued)

(58) Field of Classification Search
CPC ...... A61H 13/00; A61H 13/005; A46B 13/04; A46B 15/00; A46B 15/0002;
(Continued)

(56) References Cited

U.S. PATENT DOCUMENTS 3,424,156 A 1/1969 Smith
5,393,228 A 2/1995 Policicchio
(Continued)

FOREIGN PATENT DOCUMENTS

CN 101534745 A 9/2009
CN 102056568 A 5/2011
(Continued)

OTHER PUBLICATIONS

International Search Report dated Jan. 15, 2018, directed to International Application No. PCT/GB2017/053195; 4 pages.
(Continued)

*Primary Examiner* — Mark Spisich
(74) *Attorney, Agent, or Firm* — Morrison & Foerster LLP

(57) ABSTRACT

A dental cleaning appliance includes a handle and a fluid delivery system. The fluid delivery system includes a nozzle for delivering a burst of working fluid to the teeth of a user. A contact member for engaging the teeth of the user is moveable relative to the nozzle as the appliance is moved along the teeth of the user. A sensor provides an output which varies with movement of contact member relative to the nozzle. A control circuit actuates the delivery of working fluid to the teeth of the user depending on the output from the sensor.

37 Claims, 20 Drawing Sheets

102 34 P 278 94 32 262 30 28 72 264 270 86 78 230 278 112 88 260 116 114

(51) Int. Cl.

| | |
|---|---|
| ***A46B 15/00*** | (2006.01) |
| ***A46B 13/04*** | (2006.01) |
| ***A61C 17/028*** | (2006.01) |
| ***A61C 17/22*** | (2006.01) |
| *A61H 13/00* | (2006.01) |
| *A61C 17/28* | (2006.01) |
| *A61C 17/34* | (2006.01) |

(52) U.S. Cl.

CPC ........ *A61C 17/0202* (2013.01); *A61C 17/028* (2013.01); *A61C 17/221* (2013.01); *A61C 17/227* (2013.01); *A61C 17/28* (2013.01); *A61C 17/3436* (2013.01); *A61C 17/3445* (2013.01); *A61C 17/3454* (2013.01); *A61C 17/3472* (2013.01); *A61H 13/005* (2013.01)

(58) Field of Classification Search

CPC . A46B 15/0004; A46B 15/0012; A61C 17/00; A61C 17/02; A61C 17/0202; A61C 17/024; A61C 17/028; A61C 17/032; A61C 17/16; A61C 17/22; A61C 17/221; A61C 17/227; A61C 17/28; A61C 17/36

USPC ............. 15/22.1, 24, 29; 433/27, 28, 80–90; 601/162–165

See application file for complete search history.

(56) References Cited

U.S. PATENT DOCUMENTS

| | | | |
|---|---|---|---|
| 6,402,410 | B1 | 6/2002 | Hall et al. |
| 6,574,820 | B1 | 6/2003 | DePuydt et al. |
| 6,766,549 | B2 | 7/2004 | Klupt |
| 6,902,337 | B1 | 6/2005 | Kuo |
| 7,386,904 | B2 | 6/2008 | Fattori |
| 7,469,440 | B2 | 12/2008 | Boland et al. |
| 8,522,384 | B2 | 9/2013 | Leung |
| 8,631,532 | B2 | 1/2014 | Utsch et al. |
| 9,987,109 | B2 | 6/2018 | Sokol et al. |
| 10,034,730 | B2 | 7/2018 | Skaanland |
| 10,034,731 | B2 | 7/2018 | Chang |
| 2001/0012605 | A1 | 8/2001 | Kawamura |
| 2002/0152565 | A1 | 10/2002 | Klupt |
| 2003/0101526 | A1 | 6/2003 | Hilscher et al. |
| 2003/0135940 | A1 | 7/2003 | Lev et al. |
| 2004/0072122 | A1 | 4/2004 | Hegemann |
| 2005/0271531 | A1 | 12/2005 | Brown, Jr. et al. |
| 2005/0272001 | A1 | 12/2005 | Blain et al. |
| 2006/0078844 | A1* | 4/2006 | Goldman ............. A61C 1/0084 433/80 |
| 2008/0060148 | A1 | 3/2008 | Pinyayev et al. |
| 2009/0251687 | A1 | 10/2009 | Duineveld et al. |
| 2010/0216090 | A1 | 8/2010 | Kotlarchik et al. |
| 2010/0275394 | A1 | 11/2010 | Kemp et al. |
| 2010/0278582 | A1 | 11/2010 | Boland et al. |
| 2010/0284728 | A1 | 11/2010 | Heil et al. |
| 2011/0000502 | A1 | 1/2011 | Eubank |
| 2011/0091837 | A1 | 4/2011 | Zolhayat |
| 2011/0143310 | A1 | 6/2011 | Hunter |
| 2012/0160263 | A1 | 6/2012 | Kotlarchik et al. |
| 2012/0189976 | A1 | 7/2012 | McDonough et al. |
| 2012/0266393 | A1 | 10/2012 | Leung |
| 2012/0266396 | A1 | 10/2012 | Leung |
| 2013/0247321 | A1 | 9/2013 | Sichau |
| 2015/0164612 | A1 | 6/2015 | Kloster |
| 2015/0202030 | A1 | 7/2015 | Miller |
| 2015/0257862 | A1 | 9/2015 | Dishon |
| 2015/0374454 | A1 | 12/2015 | Beerstecher et al. |
| 2016/0015492 | A1 | 1/2016 | Skaanland |
| 2016/0192769 | A1 | 7/2016 | Bloch |
| 2016/0310248 | A1 | 10/2016 | Meerbeek et al. |
| 2016/0317267 | A1 | 11/2016 | Meerbeek et al. |
| 2016/0331117 | A1 | 11/2016 | Follows et al. |
| 2017/0116665 | A1* | 4/2017 | Alzahrani ............ A61B 5/4547 |
| 2018/0125621 | A1 | 5/2018 | Tweedie et al. |
| 2018/0177489 | A1 | 6/2018 | Yu et al. |
| 2018/0221124 | A1 | 8/2018 | Carlyle et al. |
| 2018/0289458 | A1 | 10/2018 | Follows et al. |

FOREIGN PATENT DOCUMENTS

| | | | |
|---|---|---|---|
| CN | 103815660 | A | 5/2014 |
| CN | 204146571 | U | 2/2015 |
| CN | 208926664 | U | 6/2019 |
| DE | 19935067 | * | 2/2001 |
| DE | 10 2005 014 095 | | 10/2006 |
| FR | 2 789 887 | | 8/2000 |
| GB | 2098468 | | 11/1982 |
| GB | 2538299 | | 11/2016 |
| GB | 2538308 | | 11/2016 |
| GB | 2538309 | | 11/2016 |
| JP | 55-92312 | | 6/1980 |
| JP | 56-150435 | | 11/1981 |
| JP | 58-15855 | | 1/1983 |
| JP | 7-222757 | | 8/1995 |
| JP | 11-128252 | | 5/1999 |
| JP | 2001-513358 | | 9/2001 |
| JP | 2004-97776 | | 4/2004 |
| JP | 2008-501412 | A | 1/2008 |
| JP | 2010-526638 | | 8/2010 |
| JP | 2013-226202 | | 11/2013 |
| JP | 2014-205144 | | 10/2014 |
| JP | 2015-530145 | | 10/2015 |
| JP | 2016-501618 | | 1/2016 |
| JP | 2016-508811 | | 3/2016 |
| JP | 2016-539721 | | 12/2016 |
| RU | 2463016 | | 10/2012 |
| TW | 201200105 | A1 | 1/2012 |
| WO | 99/07305 | | 2/1999 |
| WO | 02/11641 | A2 | 2/2002 |
| WO | WO-02/11641 | | 2/2002 |
| WO | 2004/021958 | | 3/2004 |
| WO | WO-2005/076818 | | 8/2005 |
| WO | 2007/025244 | A2 | 3/2007 |
| WO | 2008/147360 | | 12/2008 |
| WO | 2013/095462 | | 6/2013 |
| WO | WO-2014/033599 | | 3/2014 |
| WO | 2014/097022 | | 6/2014 |
| WO | 2014/140964 | A1 | 9/2014 |
| WO | 2014/141031 | | 9/2014 |
| WO | 2015/087176 | A1 | 6/2015 |
| WO | 2015/087219 | A1 | 6/2015 |
| WO | WO-2015/087219 | | 6/2015 |
| WO | 2016/185162 | A1 | 11/2016 |
| WO | WO-2016/185154 | | 11/2016 |
| WO | 2016/201048 | | 12/2016 |

OTHER PUBLICATIONS

Search Report dated Apr. 19, 2017, directed to GB Application No. 1618630.6; 2 pages.

Follows et al., U.S. Office Action dated Feb. 20, 2020, directed to U.S. Appl. No. 15/573,998; 13 pages.

Carlyle et al., U.S. Office Action dated May 2, 2019, directed to U.S. Appl. No. 15/886,280; 7 pages.

Tweedie et al., U.S. Office Action dated Nov. 18, 2019, directed to U.S. Appl. No. 15/802,898; 10 pages.

Tweedie et al., U.S. Office Action dated Jun. 12, 2020, directed to U.S. Appl. No. 15/802,898; 9 pages.

Tweedie et al., U.S. Office Action dated Jun. 28, 2019, directed to U.S. Appl. No. 15/802,898; 10 pages.

Tweedie et al., U.S. Office Action dated Feb. 25, 2019, directed to U.S. Appl. No. 15/802,898; 10 pages.

Notice of Reasons for Rejection dated Dec. 10, 2018, directed to JP Application No. 2017-212591; 13 pages.

The First Office Action dated Dec. 27, 2019, directed to CN Application No. 201711078181.X; 21 pages.

(56) References Cited

OTHER PUBLICATIONS

Follows et al., U.S. Office Action dated Oct. 2, 2020, directed to U.S. Appl. No. 15/573,998; 11 pages.

* cited by examiner

CLEANING APPLIANCE

REFERENCE TO RELATED APPLICATIONS

This application claims the priority of United Kingdom Application No. 1618630.6, filed Nov. 4, 2016, the entire contents of which are incorporated herein by reference.

FIELD OF THE INVENTION

The present invention relates to a cleaning appliance. The cleaning appliance is preferably a handheld cleaning appliance, and is preferably a surface treating appliance. In preferred embodiments of the invention, the appliance is a dental cleaning appliance. In a preferred embodiment, the appliance is an electric toothbrush having a fluid delivery system for delivering a fluid to the teeth of the user. This fluid may be toothpaste, or a fluid for improved interproximal cleaning. Alternatively, the appliance may not include any bristles or other elements for brushing teeth, and may be in the form of a dedicated interproximal cleaning appliance.

BACKGROUND OF THE INVENTION

Electric toothbrushes generally comprise a cleaning tool which is connected to a handle. The cleaning tool comprises a stem and a brush head bearing bristles for brushing teeth. The brush head comprises a static section which is connected to the stem, and at least one moveable section which is moveable relative to the static section, for example with one of a reciprocating, oscillating, vibrating, pivoting or rotating motion, to impart a brushing movement to bristles mounted thereon. The stem houses a drive shaft which couples with a transmission unit within the handle. The transmission unit is in turn connected to a motor, which is driven by a battery housed within the handle. The drive shaft and the transmission unit convert rotary or vibratory motion of the motor into the desired movement of the moveable section of the brush head relative to the static section of the brush head.

It is known to incorporate into an electric toothbrush an assembly for generating a jet of fluid for interproximal cleaning. For example, U.S. Pat. No. 8,522,384 describes an electric toothbrush in which the handle of the toothbrush defines a fluid chamber for storing a liquid such as water, and a slidable cover for enabling the fluid chamber to be accessed for replenishment by a user. A fluid path connects the fluid chamber to a nozzle located on a static portion of the brush head. A pump located within the fluid path is actuated upon user operation of an actuator on the handle to pump fluid from the fluid chamber to the nozzle for release under pressure from the nozzle.

SUMMARY OF THE INVENTION

In a first aspect, the present invention provides a dental cleaning appliance comprising a fluid delivery system comprising a nozzle for delivering a burst of working fluid to the teeth of a user; a contact member for engaging the teeth of the user, the contact member being moveable relative to the nozzle as the appliance is moved along the teeth of the user; a sensor for providing an output which varies with movement of the contact member relative to the nozzle; and a control circuit for actuating the delivery of working fluid to the teeth of the user depending on the output from the sensor.

In one embodiment, the contact member comprises a base and a tip. The contact member is preferably in the form of an elongate member, such as a probe, a finger or a needle. The appliance preferably comprises a handle, and the contact member is preferably moveable relative to the handle.

In a second aspect, the present invention provides a dental cleaning appliance comprising a handle, a fluid delivery system comprising a nozzle for delivering a burst of working fluid to the teeth of a user; a contact member, separate from the nozzle, for engaging the teeth of the user, the contact member being moveable relative to the handle as the appliance is moved along the teeth of the user; a sensor for providing an output which varies with movement of the contact member relative to the handle; and a control circuit for actuating the delivery of working fluid to the teeth of the user depending on the output from the sensor.

The longitudinal axis of the contact member may be aligned generally orthogonal to the longitudinal axis of the handle. The nozzle preferably extends along a nozzle axis, which passes through a fluid outlet located at the tip of the nozzle. The nozzle axis may be aligned generally parallel to the longitudinal axis of the contact member, or the nozzle axis may be angled to the longitudinal axis of the contact member. For example, the nozzle axis may be angled at an acute angle to the longitudinal axis of the contact member, for example at an angle less than 45°. The nozzle may be formed from a relatively flexible material, such as an elastomeric material or a rubber, or from a relatively rigid material, such as a stainless steel.

The contact member may be moveable relative to the nozzle, or to the handle, in such a manner that the tip of the contact member can move or deflect relative to the base of the contact member as the contact member is moved along the teeth of a user during use of the appliance, and especially when the contact member engages a side of a tooth after having entered an interproximal gap. For example, at least part of the contact member may be configured to bend. At least part of the contact member may be formed from resilient material. For example, a tip of the contact member may be formed from relatively flexible material, such as an elastomeric material or a rubber, whereas a base of the contact member may be formed from relatively stiff material, such as a plastics or metallic material. This deflection of the contact member may cause the output from the sensor to vary, in response to which the control circuit may actuate the delivery of a burst of working fluid to the teeth of the user to dislodge matter located within the gap.

Alternatively, the contact member may be moveable relative to the nozzle, or to the handle, in a direction which extends generally parallel to the nozzle axis. The contact member is preferably biased for movement relative to the nozzle in such a direction that the contact member is urged against a user's teeth during use of the appliance. As the contact member enters an interproximal gap as the contact member is moved along the user's teeth, this movement of the contact member relative to the nozzle causes the output from the sensor to vary, in response to which the control circuit actuates the delivery of a burst of working fluid to the teeth of the user to dislodge matter located within the gap. In this embodiment, the contact member is preferably formed from a relatively rigid material, such as a plastics material or a stainless steel.

The sensor may be arranged to detect directly the movement of the contact member relative to the nozzle, or to the handle. For example, the sensor may be located adjacent to the contact member. As mentioned above, the contact member may comprise a base and a tip for engaging the teeth of the user, and the sensor may be located adjacent to the base of the contact member. The sensor may be arranged to generate an output which varies depending on the relative positions between the sensor and the base of the contact member.

The sensor may be arranged to detect movement of a component which is connected to, and moveable with, the contact member. For example, an arm may be connected to the contact member, and the sensor may be arranged to detect movement of the arm relative to the handle. The arm may be biased for movement relative to the nozzle, or to the handle, in a direction which urges the contact member against a user's teeth during use of the appliance. For example, the arm may be urged to move in that direction by a resilient member which engages the arm. Alternatively, the arm may be deformed elastically in such a manner that relaxation of the arm urges the contact member against the user's teeth. Alternatively, the contact member may be secured to a body of the appliance by resilient means, for example a resilient annular flange extending outwardly from the contact member, which urges the contact member against the user's teeth. The flange may also provide a seal between the contact member and the body which inhibits the ingress of ejected working fluid or other material into the body of the appliance from around the contact member.

The arm may be moveable relative to the nozzle, or to the handle, in one of a number of different ways. For example, the arm may be slidable, rotatable or otherwise translatable relative to the nozzle. Alternatively, the arm may be extendable or expandable. In a preferred example, the arm is moveable relative to the handle about an axis. The arm is preferably pivotable about the axis. This axis is preferably substantially orthogonal to the longitudinal axis of the handle. The axis is preferably angled to the longitudinal axis of the contact member, and is more preferably substantially orthogonal to the longitudinal axis of the contact member.

The arm preferably has a rigidity which is such that arm does not deform, bend or kink as the arm moves relative to the handle or as the contact member is urged against the teeth of the user during use of the appliance. The arm is preferably formed from one of metallic and plastics material. However, if an arm is used to bias the contact member towards the user's teeth, the arm may be formed from a more flexible material to allow the arm to move freely relative to the handle.

The arm is preferably biased for movement relative to the handle by a resilient member. The resilient member may engage a component to which the arm is connected. The resilient member preferably exerts a force on the arm which is of a sufficient magnitude to allow the contact member to move, against the biasing force of the resilient member, as it is pressed against the user's teeth, and without exerting an excessive force on the teeth which is uncomfortable for the user.

The resilient member may be located between the body and the arm, so as to urge the arm to move about the axis in a direction which urges the contact member against a user's teeth during use of the appliance. The resilient member may be in the form of a spring or another elastic element. The resilient member may engage the arm directly, or it may engage a component of the appliance which is connected to the arm and moveable therewith. Such a component may be a support for supporting the arm for movement relative to the handle.

The sensor may be arranged to provide an output which varies with movement of the arm relative to the nozzle, or to the handle. The sensor may be in the form of a motion detector. The sensor may be arranged to detect motion of the contact member, or the arm, directly. For example, the sensor may be in the form of a light detector, such a camera or a light sensor, for receiving light reflected from the contact member or the arm. Alternatively, at least part of the arm may be formed from magnetic material, with the sensor being arranged to detect the movement of that magnetic part of the arm from the variation in the magnetic field experienced by the sensor. For example, the sensor may be a Hall effect sensor.

Alternatively, the sensor may be arranged to detect motion of a component which is moveable with the arm. That component may comprise a light reflective component or light emitting component. Alternatively, the component may comprise a deformable member which is connected to the arm, and the sensor may be arranged to detect the deformation of that deformable member. For example, the deformable member may be in the form of an elastic rod which is connected to the arm, and the sensor may be in the form of a strain gauge for outputting a signal which varies with the strain on the deformable member.

Preferably, the component comprises a magnet, and the sensor is preferably arranged to detect the movement of the magnet from the variation in the magnetic field experienced by the sensor as the magnet moves relative to the sensor. The magnet may be connected directly to the arm, for example to a free end of the arm. Alternatively, to facilitate assembly the magnet may be connected to a component which is itself connected to, or carried by, the arm. Where the sensor is arranged to detect movement of the base of the contact member, the magnet may be connected to the base of the contact member. Alternatively, the base of the contact member may be formed from magnetic material.

The appliance preferably comprises a head, and a stem extending between the head and the handle. The head preferably comprises at least one of the contact member and the nozzle. For example, either the nozzle or the contract member may be located adjacent to the head. The sensor may be located at a convenient location within the appliance for detecting the movement of the magnet. For example, the sensor may be located in the head. Alternatively, the sensor may be located in the handle of the appliance to facilitate its connection to the control circuit, which is preferably located in the handle of the appliance. The magnet is preferably located in the stem. The arm thus extends between the stem and the head.

A battery for supplying power to the control circuit is preferably located in the handle of the appliance. The battery is preferably a rechargeable battery.

The contact member and the nozzle preferably protrude outwardly from the head, preferably from a common side of the head. The contact member preferably protrudes outwardly from the head beyond the nozzle. The contact member may be spaced from the nozzle. For example the contact member may be located adjacent to, or alongside, the nozzle so that when the contact member enters an interproximal gap the nozzle is located in close proximity to the interproximal gap. Where the nozzle axis is angled to the longitudinal axis of the contact member, the nozzle may be angled relative to the contact member so as to direct a burst of working fluid directly in front of, or to one side of, the tip of the contact member. The nozzle can thus eject a burst of working fluid directly into the interproximal gap which the contact member has moved into, or out from.

The contact member may be spaced from the nozzle in a direction extending along, or parallel to, the longitudinal axis of the handle. The contact member may be located centrally on the head, or at or towards one end of the head. The nozzle may be located at or towards the other end of the head. Alternatively, the nozzle may be located centrally on the head, and the contact member may be located at or towards one side of the head. As a further alternative, part of the contact member may be located within a bore of the nozzle, through which working fluid is ejected from the nozzle. In this case, the sensor may be arranged to detect movement of the contact member within the bore, relative to the nozzle. For example, the sensor may be located within the head, adjacent to the base of the contact member, and detect the movement of the contact member, or a component connected to the contact member, towards and/or away from the sensor. The contact member may be co-axial with the nozzle.

The contact member is preferably moveable relative to the head. The contact member is preferably biased for movement relative to the head in a direction which extends away from the head.

The contact member is preferably moveable between a distal position and a proximal position relative to the head. The contact member is preferably biased for movement towards the distal position. The control circuit is preferably configured to actuate the delivery of working fluid to the teeth of the user in response to movement of the contact member to, or from, the distal position.

The control circuit may be configured to actuate the delivery of working fluid to the teeth of the user depending on the magnitude of the output from the sensor. Preferably, the control circuit is configured to actuate the delivery of working fluid to the teeth of the user depending on the rate of change of the output from the sensor. The output from the sensor is preferably in the form of a voltage.

In a preferred embodiment, the control circuit is configured to sample the output from the sensor at predetermined intervals to provide a series of sampled sensor outputs, S. For example, the predetermined interval may be in the range from 5 to 25 ms, and in a preferred embodiment is 10 ms. The rate of change, Sr, of the sampled sensor outputs S is calculated from the difference between consecutive sampled sensor outputs S. In the preferred embodiment, Sr is calculated every 10 ms.

The control circuit is further configured to determine an average rate of change of the sensor output, Sa, by calculating the average value of the n most recent values of Sr. The integer n is preferably in the range from 5 to 40, and in the preferred embodiment is 10. A value for Sa is thus also calculated every 10 ms. From the value of Sa, it can be determined whether, over a time period of 100 ms, the contact member is tending to move towards the distal position, move away from the distal position, or remain in a relatively stationary position relative to the handle, for example, at the distal position.

The control circuit is preferably configured to actuate the delivery of working fluid to the teeth of the user depending on the value of Sa. The control circuit may be configured to actuate the delivery of working fluid to the teeth of the user depending on the variation with time of the value of Sa. For example, the control circuit may be configured to actuate the delivery of working fluid to the teeth of the user when (i) the value of Sa has risen above, or fallen below, a first pre-set threshold value—which is indicative of the contact member moving towards its distal position—and (ii) the value of Sa has subsequently fallen below, or risen above, a second pre-set threshold value—which is indicative of the contact member being located within an interproximal gap, or moving away from an interproximal gap towards its proximal position.

An advantage associated with the actuation of the delivery of working fluid to the teeth of the user in response to movement of the contact member away from the distal position is that the working fluid is not ejected from the nozzle when the implement is moved away from the teeth of the user, for example at the end of a cleaning operation.

As mentioned above, the arm is preferably moveable about a pivot axis. As the contact member moves between its distal and proximal positions relative to the head, the contact member thus preferably moves along a curved path, preferably in the shape of an arc which has a centre which is located on the pivot axis of the arm. The extent of the angular movement of the tip of the contact member about the pivot axis is preferably in the range from 1 to 5°. In a preferred embodiment, the tip of the contact member moves about the pivot axis by an angle of approximately 2.5° as the contact member moves from the distal position to the proximal position. Thus, the contact member may be considered to be biased for movement in a plane containing the longitudinal axis of the contact member, and along a curved or circular path located within that plane. When the contact member is in its distal position, the longitudinal axis of the contact member is preferably aligned at an angle of 90° to the longitudinal axis of the handle.

To facilitate the movement of the contact member along the teeth of user during use of the appliance, the head preferably comprises means for engaging the teeth of the user, with the contact member being moveable relative to the engaging means as it moves between its distal and proximal positions. For user comfort, the engaging means may be formed from resilient or elastomeric material. The engaging means may have a substantially flat upper surface, a curved upper surface, or a stepped upper surface. For example, the engaging means may have a concave upper surface. When the contact member is in its distal position relative to the head, the tip of the contact member preferably protrudes outwardly beyond at least some of the engaging means so that, when the contact member is pressed against a user's teeth, the contact member moves away from the distal position and towards the proximal position.

The appliance may be in the form of a dedicated interproximal cleaning appliance for cleaning between the gaps in the user's teeth. As the contact member is moved along the teeth of the user, the entry of the contact member into a gap between adjacent teeth is detected through the variation in the output from the sensor resulting from the movement of the magnet relative to the sensor. For such an appliance, the engaging means may comprise a single resilient member. The resilient member may surround at least one of the contact member and the nozzle. Alternatively, the engaging means may comprise a plurality of resilient members. The resilient members may be located on opposite sides or ends of the head, or arranged about at least one of the contact member and the nozzle. For example, the resilient members may be arranged circumferentially about at least one of the contact member and the nozzle. The resilient member(s) may be formed from elastomeric material.

Alternatively, the appliance may be in the form of a toothbrush which has the additional function of improved interproximal cleaning through the emission of a burst of working fluid into the interproximal gap. Where the appliance is in the form of a toothbrush, the engaging means preferably comprises a plurality of bristles, or a plurality of bristle tufts. The bristles or bristle tufts are preferably arranged around at least one of the contact member and the nozzle, and may be arranged circumferentially about at least one of the contact member and the nozzle. Bristle tufts are preferably arranged around the nozzle, but the nozzle may be located externally of, for example, to one side of, an array of bristle tufts. In this case, the nozzle may be arranged to eject bursts of working fluid to the side of the array of bristle tufts so that the bristles are spaced from the path of each burst of working fluid emitted from the nozzle, or to eject bursts of working fluid between adjacent bristle tufts.

The bristles may be attached to a static section of the head, which section is not moveable relative to the handle. Alternatively, or additionally, a plurality of bristles may be attached to a moveable section of the head, which section is moveable relative to the handle. In a preferred embodiment, the appliance comprises a brush unit comprising a bristle carrier and a plurality of bristles mounted on the bristle carrier, with the bristle carrier being moveable relative to the handle. The contact member is preferably biased for movement relative to the brush unit in a direction extending away from the brush unit.

In addition to the movement of the contact member relative to the brush unit, the brush unit is preferably moveable relative to the contact member. The movement of the brush unit relative to the contact member, to enable the ends of the bristles to be swept over the surfaces of the teeth of the user, may thus be independent from the movement of the contact member relative to the handle to cause a burst of working fluid to be delivered to the teeth of the user. This can prevent any spurious or otherwise undesired actuation of the delivery of working fluid to the teeth of the user resulting from movement of the bristles relative to the handle.

The bristle carrier may translate, rotate, pivot or vibrate relative to the handle. For example, the bristle carrier may be arranged to orbit about the contact member, and preferably about the longitudinal axis of the contact member when the contact member is in its distal position. The brush unit preferably extends at least partially about the contact member. For example, the bristle carrier may be curved or partially annular, for example C-shaped, so as to extend partially about the contact member. Alternatively, the bristle carrier may be annular in shape, or otherwise shaped to surround the contact member. For example, the bristle carrier may comprise an aperture through which the contact member protrudes.

The appliance preferably includes a drive unit for driving the movement of the bristle carrier, and a transmission unit for converting a rotary motion generated by the drive unit into motion of the bristle carrier. The drive unit is preferably located in the handle of the appliance. The drive unit preferably comprises a motor, which is powered by the battery, and a set of gears.

As mentioned above, as an alternative to locating the sensor in the handle, and thus remote from the contact member, the sensor may be located adjacent to the contact member. For example, the sensor may be located within the head, adjacent to the base of the contact member, and arranged to detect the movement of the contact member towards and/or away from the sensor. The sensor may thus be arranged to output a signal which varies depending on the relative positions between the sensor and the base of the contact member. As described above, the sensor may be in the form of a motion detector. The sensor may be arranged to detect motion of the contact member, or the arm, directly. For example, the sensor may be in the form of a light detector, such a camera or a light sensor, for receiving light reflected from the contact member. Alternatively, at least part of the contact member may be formed from magnetic material, with the sensor being arranged to detect the movement of that magnetic part of the contact member from the variation in the magnetic field experienced by the sensor. For example, the sensor may be a Hall effect sensor, as discussed above. Alternatively, the sensor may be arranged to detect motion of a component which is moveable with the contact member. That component may comprise a light reflective component or light emitting component, or a magnet.

The working fluid is preferably a liquid working fluid, and is preferably water.

The fluid delivery system may comprise a source of pressurized working fluid and a valve. The source of pressurized working fluid and the valve are preferably located in the handle of the appliance. The control circuit is preferably configured to open the valve for a period of time depending on the output from the sensor. The valve is preferably opened for a time period which is sufficient to allow a burst of pressurized working fluid having a selected volume to pass from the source to the nozzle for delivery to the teeth of the user. This time period is preferably less than 1 second, more preferably less than 0.5 seconds, and even more preferably less than 0.25 seconds.

Where the working fluid is a liquid working fluid, the source of pressurized working fluid may be in the form of a hydraulic accumulator. The hydraulic accumulator is preferably one of a spring-type accumulator, and a gas-charged accumulator. The accumulator preferably comprises a fluid chamber for storing working fluid under pressure. The accumulator is preferably arranged to store working fluid at a pressure in the range from 4 to 7 bar. The fluid chamber preferably has a capacity in the range from 0.1 to 1 ml. The valve is preferably a solenoid valve. The fluid delivery system may comprise a pump for supplying working fluid to the accumulator when the solenoid valve is in a closed position. The pump is arranged to draw working fluid through a fluid inlet. The pump is preferably in the form of a piston pump. Alternatively, the pump may be a diaphragm pump.

As an alternative, the fluid delivery system may comprise a pump for drawing working fluid through a fluid inlet of the fluid delivery system, and for delivering a burst of working fluid to the nozzle. In other words, the fluid delivery system may be provided without an accumulator and a solenoid valve. The pump may be in the form of a positive displacement pump, such as a piston pump or a diaphragm pump.

As discussed above, the control circuit may be arranged to deliver a single burst of working fluid depending on the output from the sensor. However, the control circuit may be arranged to deliver a series of bursts of working fluid depending on the output from the sensor. Within a series, the time period between successive bursts of working fluid is preferably substantially equal, preferably in the range from 1 to 25 ms, and more preferably in the range from 2 to 10 ms, so that the entire series of bursts may be delivered to a single interproximal gap. This can allow for a slight variation in the position of the tip of the nozzle relative to interproximal gap between each successive burst, and so potentially improving the removal of material from within the interproximal gap.

The number of bursts within a series is preferably in the range from two to ten. The volume of working fluid delivered to the teeth of a user in a series of bursts is preferably in the range from 0.1 to 1 ml. Within a series of bursts, each burst of working fluid preferably has substantially the same, which is preferably in the range from 0.05 to 0.5 ml, and more preferably in the range from 0.05 to 0.25 ml.

The appliance preferably comprises a fluid reservoir for storing working fluid, preferably a liquid working fluid, and from which working fluid is supplied to the fluid delivery system. The fluid reservoir preferably has a capacity in the range from 5 to 50 ml. For example, a fluid reservoir having a capacity of 25 ml, used in combination with an accumulator having a fluid capacity of 0.25 ml, can supply a sufficient quantity of working fluid to the accumulator to allow up to 100 bursts, or 100 series of bursts, of 0.25 ml of working fluid to be delivered to the teeth of a user.

The fluid reservoir is preferably refillable. The fluid reservoir thus preferably comprises a fluid port through which the fluid reservoir may be replenished with working fluid by the user. The fluid port may be located in a wall which delimits the fluid reservoir, or it may be located remotely from the fluid reservoir and placed in fluid communication with the fluid reservoir by a fluid conduit which extends from the fluid port to the fluid reservoir.

The handle of the appliance may comprise the fluid reservoir. For example, the fluid reservoir may be fully contained within the body of the handle. Alternatively, an external wall of the handle may at least partially delimit the fluid reservoir. At least part of that external wall may be transparent to allow a user to see the volume of working fluid contained within the fluid reservoir. To replenish such a fluid reservoir, the fluid port may be exposed manually by the user through moving a cover on the body of the handle, or through removing a bung or other closure device from the fluid port.

The fluid reservoir may be housed within the stem. As above, an external wall of the stem may at least partially delimit the fluid reservoir, and at least part of that external wall may be transparent to allow a user to see the volume of working fluid contained within the fluid reservoir.

As an alternative to housing the fluid reservoir within the stem, the fluid reservoir may be connected to the stem so as to be located externally of the stem. This can allow the fluid reservoir to be detached from the stem for replenishment or replacement as required. Alternatively, the fluid reservoir may be partially delimited by an external wall which is connected to the stem. Again, at least part of that external wall may be transparent to allow a user to see the volume of working fluid contained within the fluid reservoir.

To maximize the capacity of the fluid reservoir and to provide for a relatively even weight distribution about the longitudinal axis of the appliance, the fluid reservoir preferably extends about, or surrounds, the stem.

The appliance preferably comprises a cleaning tool connected to the handle. The cleaning tool comprises the nozzle of the fluid delivery system, and the contact member. The cleaning tool preferably comprises the head and the stem of the appliance.

The cleaning tool is preferably detachably connected to the handle. This can allow the cleaning tool to be replaced, for example when a non-refillable fluid reservoir has become depleted, or when the bristles and/or the nozzle of the appliance have become worn. This can also allow a different cleaning tool to be connected to the handle, for example for use by a different user. As discussed above, the sensor may be provided in the handle of the appliance, which facilitates the electrical connection between the sensor and the control circuit. Alternatively, the sensor may be located in the detachable cleaning tool, for example in the head of the cleaning tool. In this case, the cleaning tool may comprises a transmitter for transmitting to the control circuit a signal output from the sensor, and the control circuit may comprise a receiver for receiving the signal emitted from the transmitter. The signal may be an electromagnetic signal. Alternatively, the cleaning tool and the handle may comprise electrical contacts which make contact when the cleaning tool is connected to the handle to enable the control circuit to receive a signal output from the sensor.

The fluid reservoir preferably comprises an external wall which surrounds part of the stem. That part of the stem is preferably located adjacent to the handle of the appliance. At least part of that external wall is preferably transparent, and is preferably formed from transparent plastics material to allow a user to see the volume of working fluid within the fluid reservoir. In a preferred embodiment, the external wall is a single molded component formed from transparent material.

The external wall of the fluid reservoir preferably has one of a curved shape, a convex shape, and a faceted shape. The external wall may have a curvature which is one of ellipsoidal, spheroidal and spherical.

As mentioned above, the appliance may comprise a fluid port through which the fluid reservoir is replenished with working fluid. The fluid port is preferably located in an external wall of the fluid reservoir. A bung or other closure member may be removably located within the fluid port to inhibit leakage of working fluid from the fluid reservoir through the fluid port. In a preferred embodiment, the fluid reservoir comprises a closure member which is pivotably connected thereto for movement between an open position, in which the fluid port is exposed by the closure member, and a closed position in which part of the closure member is located within the fluid port.

At least part of the external wall of the fluid reservoir is preferably transparent, and is preferably formed from transparent plastics material to allow a user to see the volume of working fluid within the fluid reservoir. In a preferred embodiment, the external wall preferably has one of a curved shape, a convex shape, and a faceted shape. The external wall may have a curvature which is one of ellipsoidal, spheroidal and spherical.

The fluid reservoir may comprise an inner wall which is connected to the external wall. The inner wall may be annular or tubular in shape, and located around the stem so as to provide a sleeve which forms a connection with the stem when the fluid reservoir is mounted on the stem. Both ends of the inner wall may be joined, for example using a welding technique or using an adhesive, to the external wall. Alternatively, the inner wall may be integral with at least part of the external wall. In a preferred embodiment, the external wall comprises an upper section and a lower section. The inner wall is preferably integral with the upper section of the external wall, and is joined to the lower section of the external wall. The fluid port is preferably formed in the lower section of the external wall, which is preferably integral with the bottom wall of the fluid reservoir. The upper section of the external wall is preferably formed from relatively transparent material. The lower section of the external wall may be formed from relatively opaque material, or from the same relatively transparent material as the upper section of the external wall.

The inner wall preferably forms an interference fit with the stem to prevent the fluid reservoir from inadvertently sliding from the stem when the cleaning tool is detached from the handle. The inner wall preferably forms an interference fit with a cylindrical, external surface of the stem.

The fluid delivery system preferably comprises a cleaning tool conduit system and a handle conduit system. The handle conduit system preferably comprises a fluid inlet port for receiving working fluid from a fluid outlet port of the fluid reservoir. The fluid outlet port of the fluid reservoir is preferably formed in the bottom wall of the fluid reservoir. The handle conduit system comprises a plurality of conduits for conveying working fluid between the fluid inlet port, the pump and a fluid outlet port of the handle. The cleaning tool conduit system preferably comprises a fluid inlet port for receiving a burst of working fluid from the handle fluid outlet port, and at least one conduit for conveying the burst of working fluid to the nozzle.

The handle preferably comprises a spigot to which the stem is detachably connected. The spigot is generally cylindrical in shape, and comprises an external cylindrical surface which preferably forms an interference fit with an inner surface of the stem. The fluid outlet port of the handle is preferably located on the spigot. The stem is preferably pushed on to the spigot by the user. The inner surface of the stem is preferably generally cylindrical or tubular in shape, and is preferably formed from resilient material so that radial forces generated as the stem is mounted on the spigot act to retain the stem on the spigot. A resilient member, such as a spring clip, may be provided about the inner surface of the stem for urging, or biasing, the inner surface radially inwardly.

The handle may comprise an annular seat extending about the spigot for receiving the fluid reservoir. The fluid inlet port of the handle is preferably located on the seat so that the fluid outlet port of the fluid reservoir connects to the fluid inlet port of the handle when the fluid reservoir is mounted on the seat.

The stem preferably comprises a retaining member for retaining the fluid reservoir on the seat when the cleaning tool is connected to the handle. This retaining member may comprise a flange extending outwardly from the external surface of the stem. The fluid reservoir may thus be held between the flange and the handle when the cleaning tool is connected to the handle, inhibiting inadvertent movement of the fluid reservoir away from the handle and thus disconnection of the fluid outlet port of the fluid reservoir from the fluid inlet port of the handle. The flange is preferably annular in shape so that an even pressure can be applied about the fluid reservoir. The fluid reservoir preferably comprises a recess, more preferably an annular recess, for receiving the retaining member. The recess is preferably located on the external wall of the fluid reservoir.

The entire inner wall of the fluid reservoir, along with the external wall of the fluid reservoir, may be formed from relatively rigid plastics material, so that the capacity of the fluid reservoir is fixed and is defined by the internal surfaces of the external wall and the inner wall.

As discussed above, the appliance comprises a control circuit for actuating the delivery of working fluid to the teeth of the user depending on the output from one or more sensors, which are each arranged to detect movement of a contact member relative to the nozzle, or to the handle. To reduce the risk of undesired ejection of bursts of working fluid, for example during handling of the appliance, the appliance preferably has a first operational mode in which the delivery of the burst of working fluid to the teeth of a user is inhibited and a second operational mode in which the burst of working fluid to the teeth of a user is permitted, and wherein, during use of the appliance, the control circuit is arranged to effect a transition between the first operational mode and the second operational mode automatically depending on a detected operational parameter of the appliance.

One of a number of different operational parameters of the appliance may be detected to effect a transition between the operational modes of the appliance. For example, the operational parameter may be one of:

- the activation state (on or off) of a motor for driving the movement of a bristle carrier;
- the magnitude of the current drawn by the motor;
- the magnitude of a load applied to the appliance during use, such as a force applied to the cleaning tool via the engaging means, a force applied to the or each contact member, or a force applied to the handle as it is gripped by the user;
- the orientation of the appliance; and
- the volume of working fluid in the fluid reservoir.

The control circuit is preferably arranged to effect a transition between the first operational mode and the second operational mode when the detected operational parameter of the appliance is above a non-zero threshold value.

In addition, or an alternative, to the delivery of a burst of working fluid to the nozzle depending on the output from a sensor, the control circuit may be arranged to actuate the delivery of fluid to the teeth of a user in response to a user action on the appliance. That user action on the appliance may be the actuation of a button of the appliance.

For example, the appliance may have an "automatic" mode, or first mode of fluid delivery, which is selectable by the user and in which a burst of working fluid is delivered to the teeth of a user depending on the output from the sensor. When that mode is not selected by the user, or when a "manual" mode, or a second mode of delivery, is selected by the user, the burst of working fluid is delivered to the user's teeth depending on the user action on the appliance.

Where the cleaning tool comprises a moveable bristle carrier, the detected operational parameter preferably comprises the magnitude of the current drawn by the motor to move the bristle carrier. The drive unit and the transmission unit are preferably arranged to generate a constant speed of movement of the bristle carrier relative to the handle. When the appliance is first activated, or switched on, by the user, the appliance tends not to be in contact with the user's teeth. As a result, the current drawn by the motor tends to be relatively low, and is preferably below a set threshold value so that the appliance is in the first operational mode when first activated.

When the bristles are urged against the teeth of the user, the resistance to the motion of the bristle carrier increases depending on the force with which the bristles are pressed against the teeth. To maintain a constant speed of movement of the bristle carrier, the motor draws an increased amount of current depending on the force applied to the bristle carrier. The control circuit detects the magnitude of the current drawn by the motor, and when that current exceeds a threshold value, which is indicative of the current required to move the bristles against a user's teeth, the control circuit effects the transition to the second operational mode. When the detected current falls below that threshold value, the control circuit effects a transition back to the first operational mode.

As mentioned above, the contact member is preferably moveable between a proximal position and a distal position. As the bristles are pressed against a user's teeth, the bristles will deflect, reducing the direct spacing between the ends of the bristles and the bristle carrier and, simultaneously, moving the tip of the contact member towards the bristle carrier, and so towards its proximal position. Depending on how far the bristles bend during use, and thus on the stiffness of the bristles, the movement of the contact member relative to the head can be detected from the variation of the output received from the sensor, and used as an indicator of the load being applied to the head during use of the appliance. This can be particularly useful when the bristles are mounted on a static bristle carrier, or directly to the head of the appliance.

As mentioned above, the cleaning tool is preferably detachably connected to the handle. This can allow a handle to be provided with a set of similar cleaning tools, each with a respective different identifier. This can also allow a handle to be provided with a set of dissimilar cleaning tools. For example, the set of cleaning tools may be selected from two or more of a first type of cleaning tool with a nozzle and a moveable brush unit, a second type of cleaning tool with a nozzle and a static brush unit, a third type of cleaning tool with a nozzle and no bristles, and a fourth type of cleaning tool with a moveable brush unit and no nozzle. A number of respective different cleaning tools of the same type may also be provided, for example, of the first type of cleaning tool, with bristles having a respective different stiffness, or with nozzles having respective different fluid outlet sizes.

The appliance is preferably a handheld appliance which includes all of the aforementioned components of the appliance.

The cleaning tools may be sold as stand-alone items, for example as spare parts or as alternative cleaning tools for use with an existing handle. The handle of the appliance may also be provided separately from the cleaning tool, for example as a spare part for the appliance, or for use by a different user. For example, handles having respective different shapes may be provided for use by users of different age.

One or more of the aforementioned aspects of the invention may also be applied more generally to cleaning apparatus or a cleaning appliance. The apparatus may be a surface treating appliance. For example, the apparatus may be in the form of apparatus, preferably a handheld apparatus, for cleaning a work surface, in which the brush unit is arranged to engage a work surface and the nozzle is arranged to deliver cleaning fluid to the work surface during cleaning.

Features described above in connection with the first aspect of the invention are equally applicable to the second aspect of the invention, and vice versa.

BRIEF DESCRIPTION OF THE DRAWINGS

Preferred features of the present invention will now be described by way of example only with reference to the accompanying drawings, in which.

DETAILED DESCRIPTION OF THE INVENTION

Figure 1A:
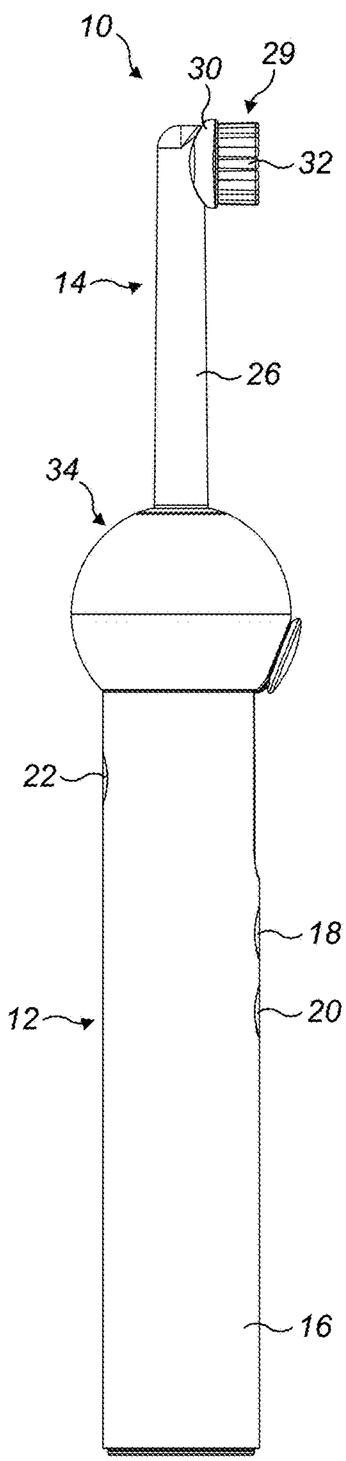
FIG. 1(*a*) is a right side view of a dental cleaning appliance, FIG. 1(*b*) is a front view of the appliance, and FIG. 1(*c*) is a left side view of the appliance.
Figure 1B:
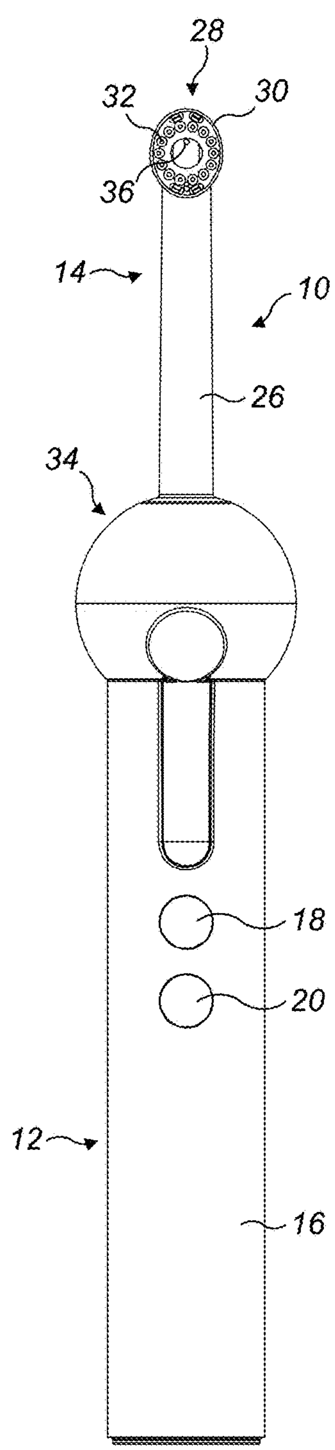
Figure 1C:
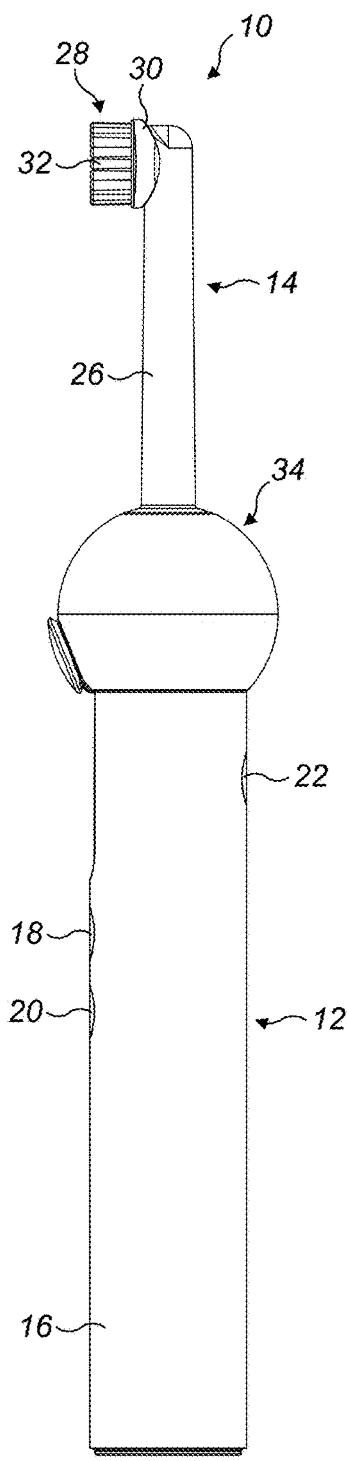

FIGS. 1(*a*) to 1(*c*) illustrate external views of an embodiment of a dental cleaning appliance 10. In this embodiment, the appliance is in the form of a handheld appliance, which is in the form of an electric toothbrush having an integrated assembly for dispensing a working fluid for improved interproximal cleaning.

The appliance 10 comprises a handle 12 and a cleaning tool 14. The handle 12 comprises a body 16 which is gripped by a user during use of the appliance 10. The body 16 is preferably formed from plastics material, and is preferably generally cylindrical in shape. The handle 12 comprises a plurality of user operable buttons 18, 20, 22 which are located within respective apertures formed in the body 16 so as to be accessible to the user. The handle 12 may also comprise a display (not shown) which is positioned so as to be visible to a user during use of the appliance. For example, the display may be visible to the user through the body 16 of the handle 12, or through a transparent panel connected to the body 16 of the handle 12.

The cleaning tool 14 comprises a stem 26 and a head 28. The stem 26 is elongate in shape, which serves to space the head 28 from the handle 12 to facilitate user operability of the appliance 10. In this embodiment, the head 28 of the cleaning tool 14 comprises a brush unit, which comprises a bristle carrier 30 and a plurality of bristles 32 mounted on the bristle carrier 30. However, in other embodiments the cleaning tool 14 may be provided without a brush unit so that the appliance is in the form of a dedicated interproximal cleaning appliance for cleaning between the gaps in the user's teeth.

The cleaning tool 14 also comprises a fluid reservoir 34 for storing a working fluid, and a nozzle 36 for delivering one or more bursts of working fluid to the teeth of the user during use of the appliance 10. The fluid reservoir 34 is connected to the stem 26, and preferably extends at least partially around the stem 26. In this embodiment which includes a brush unit, the brush unit extends at least partially around the nozzle 36.

The nozzle 36 forms part of a fluid delivery system 40 for receiving working fluid from the fluid reservoir 34 and for delivering bursts of working fluid to the teeth of a user during use of the appliance 10. In this embodiment, the working fluid is a liquid working fluid, which is preferably water. Each burst of working fluid preferably has a volume which is less than 1 ml, more preferably less than 0.5 ml, and in this example is around 0.25 ml. The tip of the nozzle 36 comprises a fluid outlet 42 through which a burst of working fluid is delivered to the teeth of the user.

Figure 2:
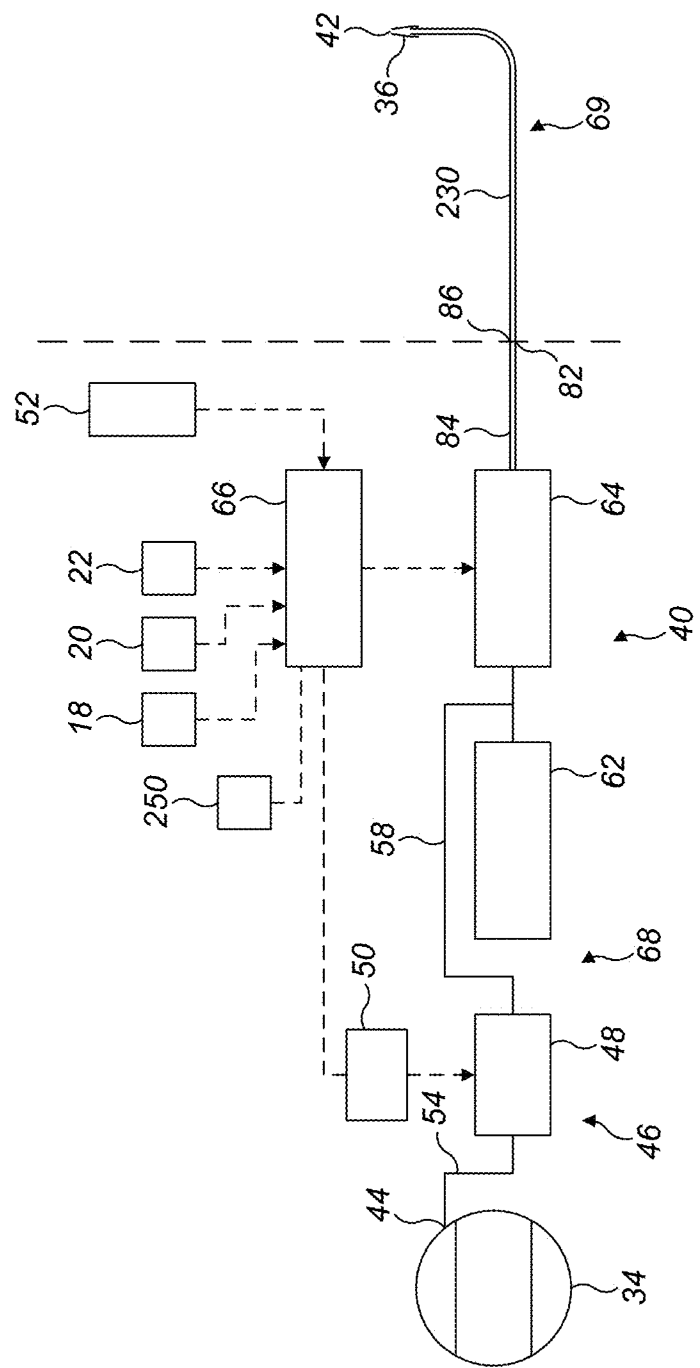
FIG. 2 illustrates schematically components of a fluid delivery system for delivering a burst of a working fluid to the teeth of a user.

The fluid delivery system 40 is illustrated schematically in FIG. 2. In overview, the fluid delivery system 40 comprises a fluid inlet 44 for receiving working fluid from the fluid reservoir 34, and a pump assembly 46 for drawing working fluid from the fluid reservoir 34 through the fluid inlet 44. The pump assembly 46 is located within the handle 12. As discussed in more detail below, the pump assembly 46 comprises a positive displacement pump 48 and a drive for driving the pump 48. The drive comprises a stepper motor 50, preferably a linear stepper motor, and a linear actuator connected to the motor 50. A battery 52 for supplying power to the motor 50 is also located in the handle 12. The battery 52 is preferably a rechargeable battery.

A first conduit 54 connects the fluid inlet 44 of the fluid delivery system 40 to a fluid inlet 56 of the pump 48. A second conduit 58 connects a fluid outlet 60 of the pump 48 to a hydraulic accumulator 62. A solenoid valve 64 is located downstream from the accumulator 62. A control circuit 66 controls the actuation of the motor 50, and so the motor 50 and the control circuit 66 provide a drive for driving the pump 48. The battery 52 supplies power to the control circuit 66. The control circuit 66 includes a motor controller, which supplies power to the motor 50. The control circuit 66 also controls the movement of the solenoid valve 64 between a closed position, which is adopted when working fluid is being delivered to the accumulator 62 by the pump 48, and an open position, which is adopted to effect the delivery of a burst of working fluid from the accumulator 62 to the nozzle 36.

In this embodiment, the control circuit 66 receives signals generated when the user depresses the buttons 18, 20, 22 located on the handle 12 of the appliance 10. Alternatively, or additionally, the control circuit 66 may receive signals which are generated by a sensor located within the appliance, or which are received from a remote device, such as a display or a personal device. For brevity, in the following description the control circuit 66 receives signals which are generated when the user operates one of the buttons 18, 20, 22.

The fluid inlet 44, the pump assembly 46, the accumulator 62 and the solenoid valve 64 are located in the handle 12. In other words, a first part 68 of the fluid delivery system 40 is located in the handle 12, and a second part 69 of the fluid delivery system 40 is located in the cleaning tool 14.

Figure 3:
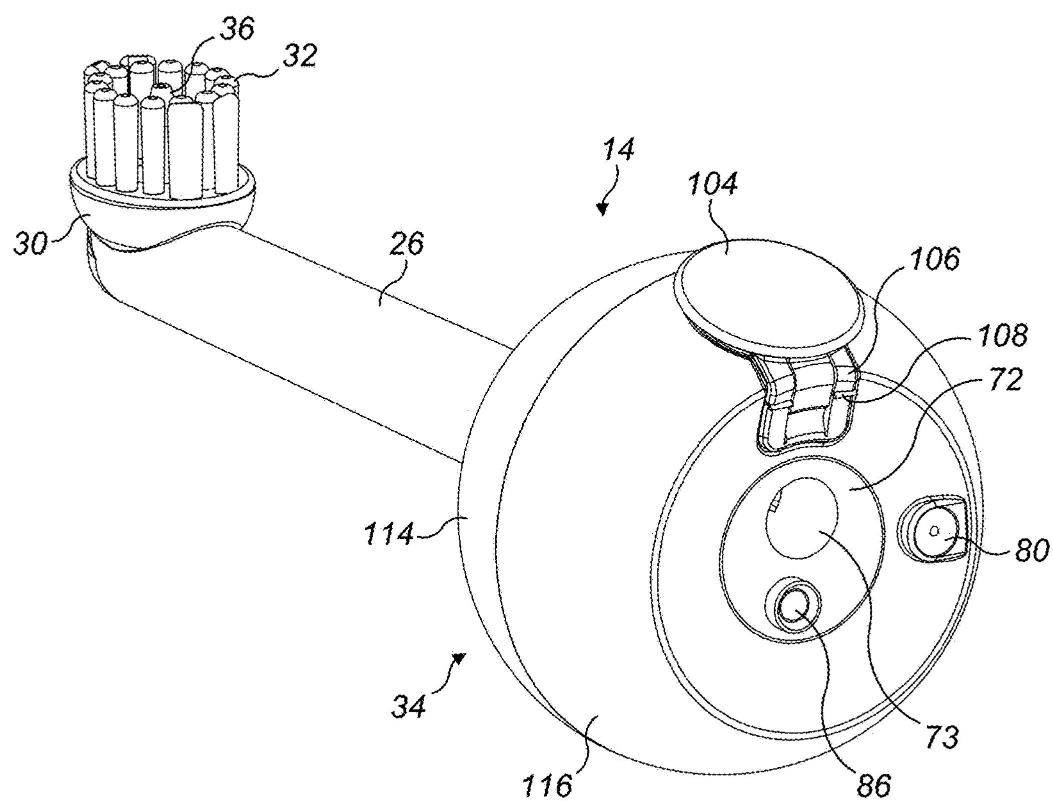
FIG. 3 is a right side perspective view, from above, of a cleaning tool of the appliance.
Figure 4:
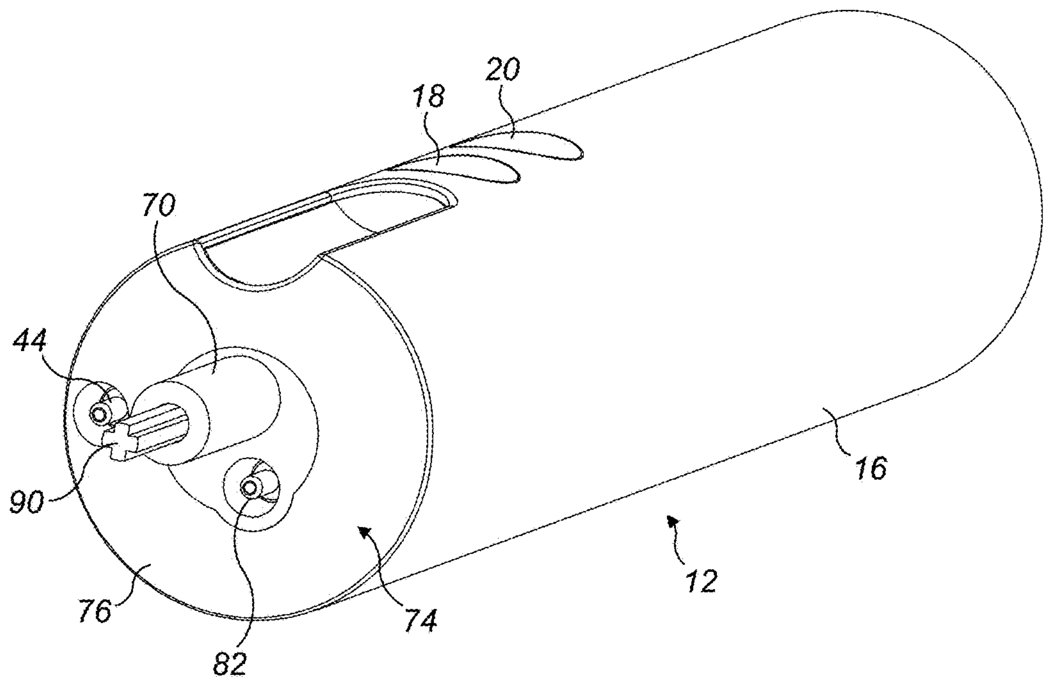
FIG. 4 is a right side perspective view, from above, of a handle of the appliance.
Figure 5:
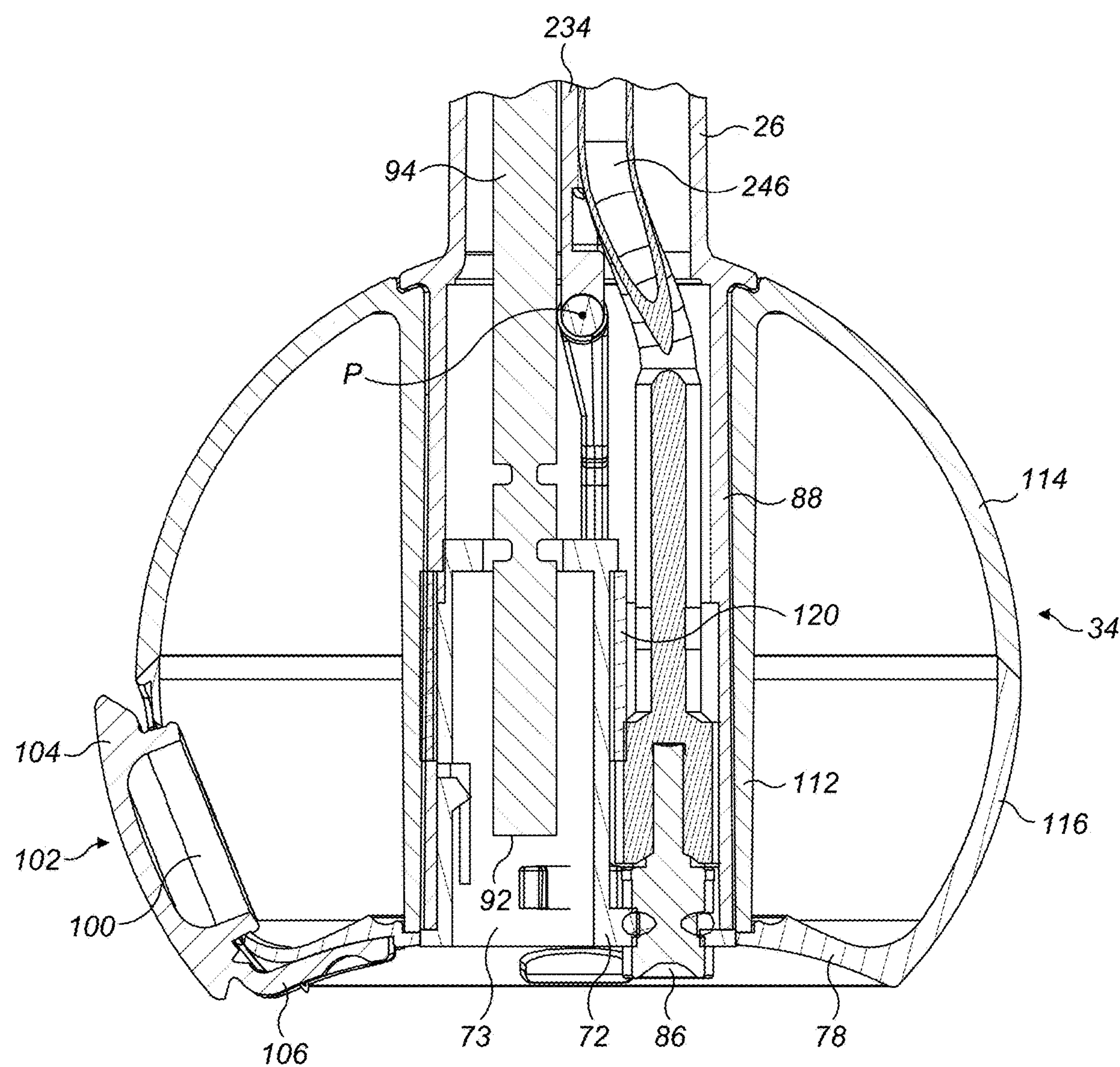
FIG. 5 is a side sectional view of a lower part of the cleaning tool.
Figure 6:
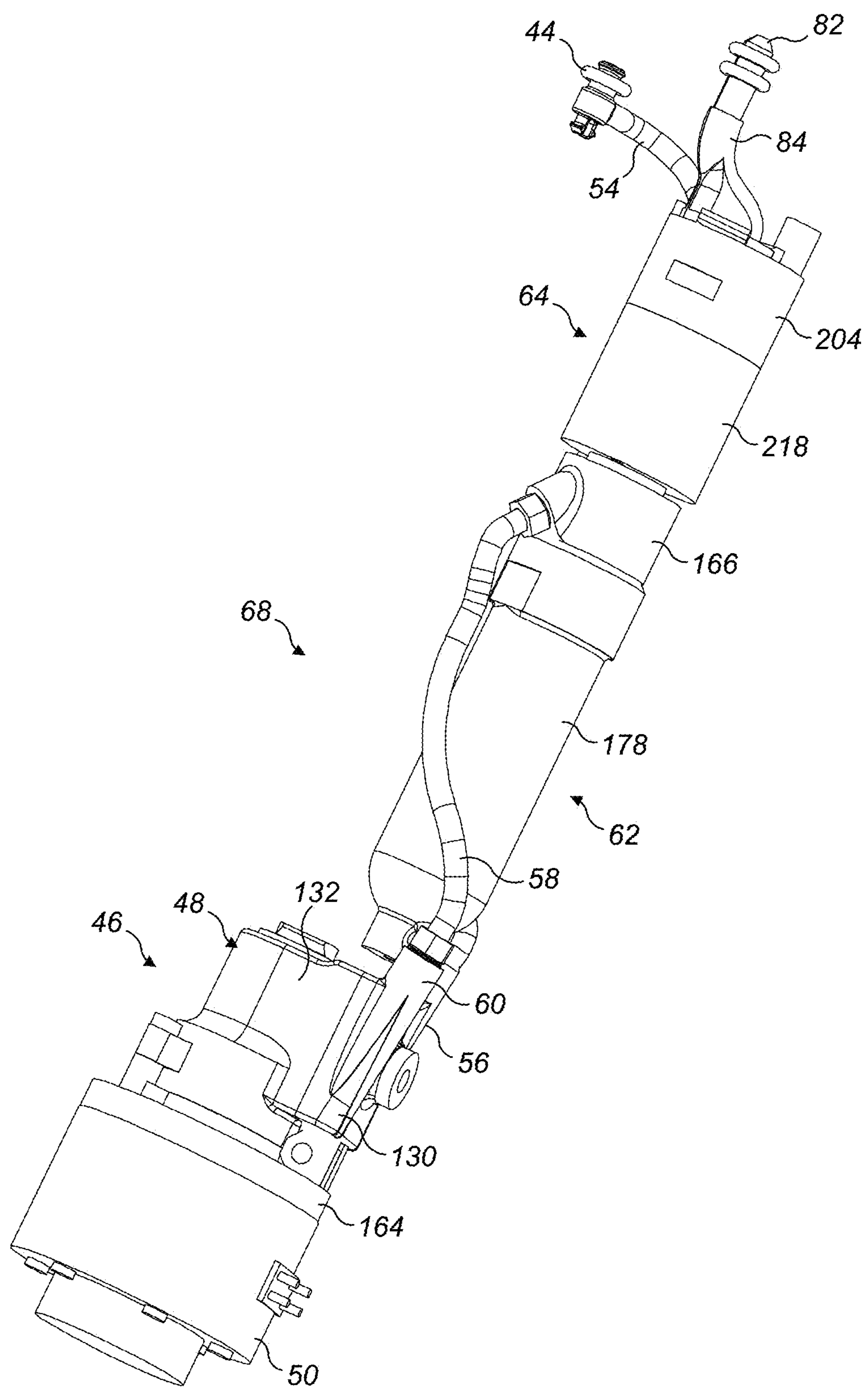
FIG. 6 is a perspective view of a first part of the fluid delivery system which is located in the handle of the appliance.
Figure 7:
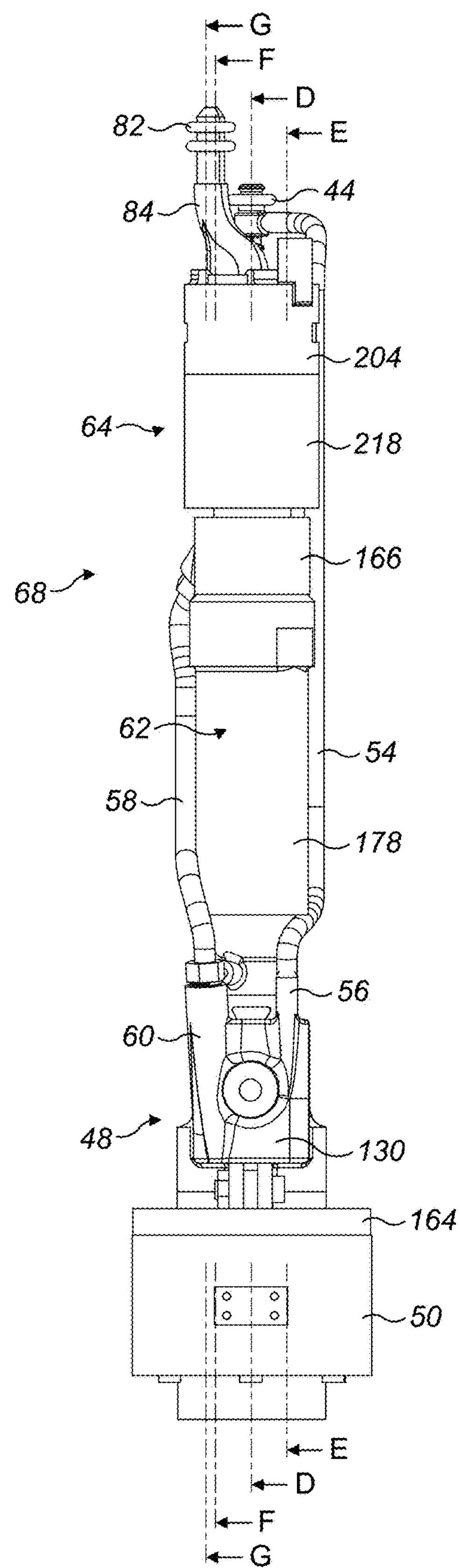
FIG. 7 is a front view of the first part of the fluid delivery system.
Figure 8:
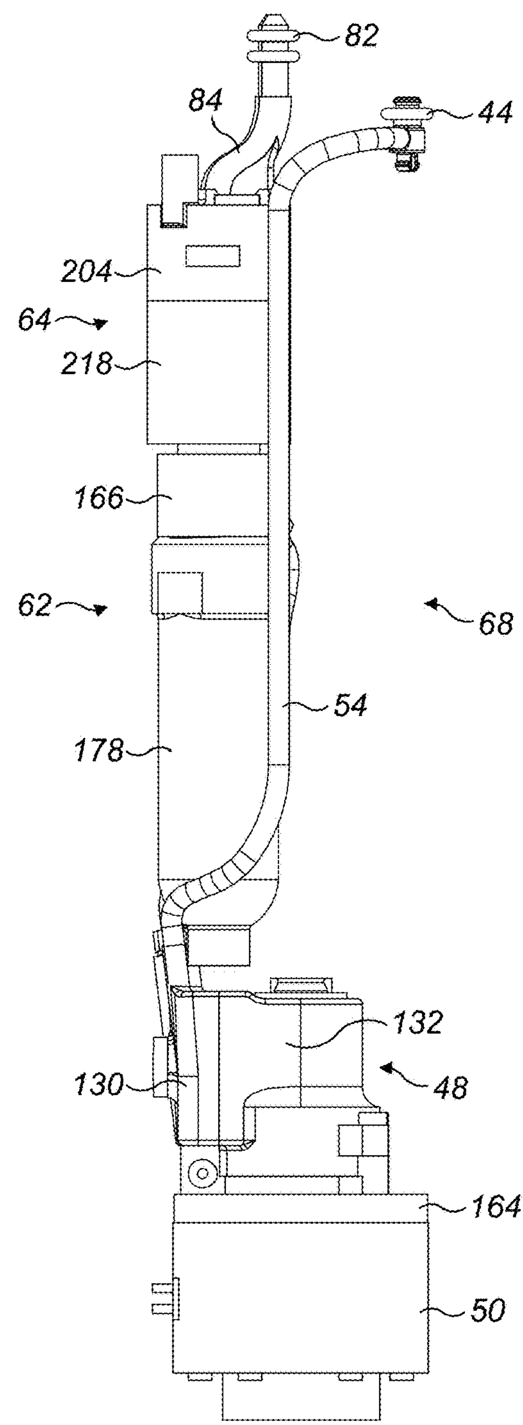
FIG. 8 is a side view of the first part of the fluid delivery system.
Figure 9:
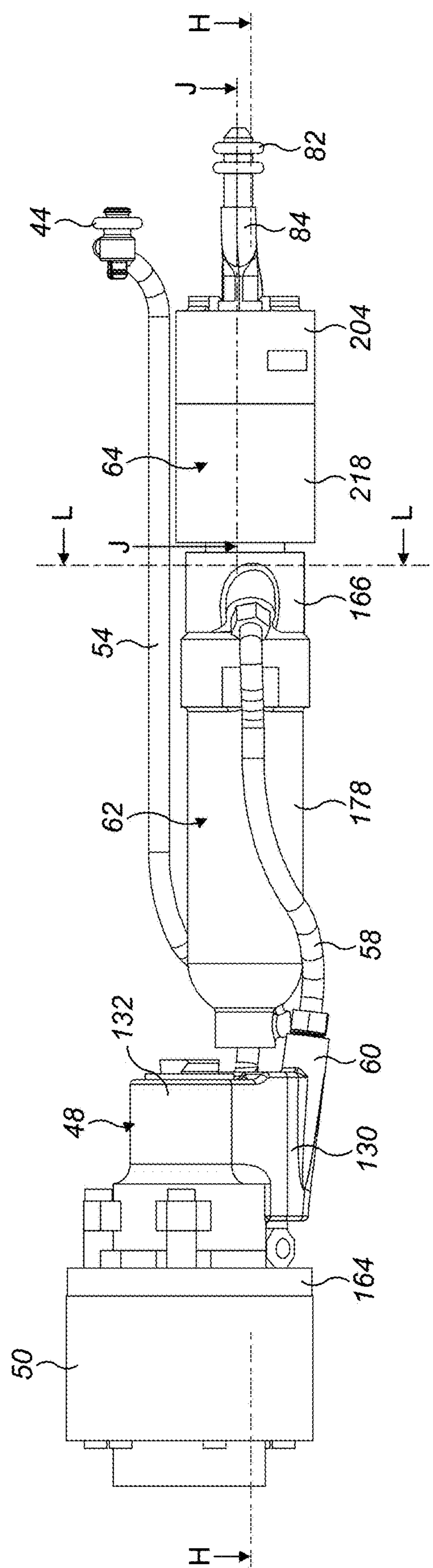
FIG. 9 is a rear view of the first part of the fluid delivery system.

The cleaning tool 14 is detachably connected to the handle 12. With reference to FIGS. 3 to 5, the handle 12 comprises a male connector, preferably in the form of a spigot 70, which is received by a complementary female connector, preferably in the form of a recessed connector 72, of the cleaning tool 14. The recessed connector 72 defines a generally cylindrical recess 73 for receiving the spigot 70. The spigot 70 preferably protrudes outwardly from an end wall 74 of the body 16, and preferably in a direction which is parallel to a longitudinal axis of the handle 12. The end wall 74 defines an annular seat 76 for receiving an annular bottom wall 78 of the fluid reservoir 34 when the cleaning tool 14 is mounted on the handle 12. The annular seat 76 comprises the fluid inlet 44 of the fluid delivery system 40. The fluid inlet 44 receives fluid from a reservoir fluid outlet port 80 of the fluid reservoir 34 when the cleaning tool 14 is mounted on the handle 12. The handle 12 comprises a handle fluid outlet port 82 located adjacent to the spigot 70, and which is connected to an outlet from the solenoid valve 64 by a third conduit 84 located in the handle 12. The cleaning tool 14 comprises a cleaning tool fluid inlet port 86 for receiving fluid from the handle fluid outlet port 82 when the cleaning tool 14 is connected to the handle 12. The cleaning tool fluid inlet port 86 protrudes from the base of the recessed connector 72. The recessed connector 72 is housed within, and connected to, a relatively wide base section 88 of the stem 26.

As mentioned above, the cleaning tool 14 includes a bristle carrier 30 which is moveable relative to the stem 26. The appliance 10 comprises a drive mechanism for driving the movement of the bristle carrier 30 relative to the stem 26. The drive mechanism comprises a transmission unit connected to the bristle carrier 30, and a drive unit for driving the transmission unit to move the bristle carrier 30 relative to the stem 26. The handle 12 comprises the drive unit of the drive mechanism. The drive unit comprises a motor, preferably in the form of a dc motor, which is actuated by the control circuit 66 in response to the user depression of one or more of the buttons of the handle 12. The motor of the drive unit is connected via a gear train to a rotatable drive unit coupling member 90 which protrudes outwardly from the spigot 70, and which rotates relative to the body 16 upon actuation of the motor of the drive unit. The cleaning tool 14 comprises the transmission unit of the drive mechanism. The transmission unit comprises a transmission unit coupling member 92 which couples with, and preferably receives, the drive unit coupling member 90 when the cleaning tool 14 is connected to the handle 12. The transmission unit coupling member 92 is connected to, and is preferably integral with, one end of a connecting rod 94 housed within the stem 26. The other end of the connecting rod 94 is connected to the side surface of the bristle carrier 30 so that periodic rotation of the connecting rod 94 about a 15° angle results in a 15° sweeping movement of the bristle carrier 30 relative to the stem 26.

As mentioned above, the fluid reservoir 34 is mounted on, and extends at least partially around, the stem 26 of the cleaning tool 14. In this embodiment, the fluid reservoir 34 is annular in shape, and so surrounds the stem 26. The fluid reservoir 34 is preferably located at or towards the end of the stem 26 which is remote from the head 28, and so in this embodiment extends around the base section 88 of the stem 26. The fluid reservoir 34 preferably has a capacity in the range from 5 to 50 ml, and in this embodiment has a capacity of 25 ml.

The fluid reservoir 34 is filled through a reservoir fluid inlet port 100 formed in the external wall of the fluid reservoir 34. The fluid inlet port 100 is preferably formed in an annular external side wall of the fluid reservoir 34. The reservoir fluid inlet port 100 is sealed by a closure member 102. The closure member 102 is moveable relative to the fluid reservoir 34 between a closed position, as shown in FIG. 3, in which the closure member 102 inhibits the leakage of working fluid from the reservoir fluid inlet port 100, and an open position. In this embodiment, the closure member 102 is pivotably connected to the fluid reservoir 34. The closure member 102 is locatable within, and forms a fluid-tight seal against, the reservoir fluid inlet port 100. The closure member 102 comprises a head 104 which may be gripped by the user to move the closure member 102 from the closed position to the open position, and which may be pushed by the user towards the reservoir fluid inlet port 100 to return the closure member 102 to the closed position.

The closure member 102 is connected to the fluid reservoir 34 by a pair of arms 106. One end of each arm 106 is connected to the closure member 102, and the other end of each arm 106 is connected to the fluid reservoir 34. In this embodiment, the arms 106 are integral with the closure member 102, with a portion of each arm 106 which is remote from the closure member 102 being connected to the bottom wall 78 of the fluid reservoir 34, for example using an adhesive or by welding. Each arm 106 comprises a hinge 108, which may be formed from a part of the arm 106 which has a locally reduced thickness, to enable the part of the arm 106 which is connected to the closure member 102 to pivot relative to the other part of the arm 106 which is connected to the fluid reservoir 34.

To fill the fluid reservoir 34, the user detaches the cleaning tool 14 from the handle 12, grips the head 104 of the closure member 102 between finger and thumb and pulls it out from the reservoir fluid inlet port 100. The fluid reservoir 34 may then be filled by the user, for example by locating the reservoir fluid inlet port 100 beneath a running tap. Once the fluid reservoir 34 has been filled, the user pushes the head 104 of the closure member 102 back into the reservoir fluid inlet port 100, and reconnects the cleaning tool 14 to the handle 12. The pivoting connection between the closure member 102 and the bottom wall 78 of the fluid reservoir 34 inhibits accidental loss of the closure member 102 while the reservoir fluid inlet port 100 is exposed, and enables the joint between the closure member 102 and the fluid reservoir 34 to be located between the handle 12 and the fluid reservoir 34 when the cleaning tool 14 is mounted on the handle 12. As shown in FIG. 3, the lower parts of the arms 106 of the closure member 102 are located within a recessed section of the bottom wall 78 of the fluid reservoir 34 when the closure member 102 is in its closed position so that the bottom surfaces of the lower parts of the arms 106 are substantially flush with the bottom wall 78 of the fluid reservoir 34.

At least part of the external wall of the fluid reservoir 34 is preferably transparent to allow a user to observe the contents of the fluid reservoir 34, and so assess whether the fluid reservoir 34 requires replenishment prior to the desired use of the appliance 10. The external wall preferably has a shape which is symmetrical about the longitudinal axis of the cleaning tool 14. The external wall preferably has a curved shape, more preferably a convex curved shape, but alternatively the external wall may have a polygonal or faceted shape. In this embodiment, the external wall has a spherical curvature. As described below, the fluid reservoir 34 is mounted on the relatively wide base section 88 of the stem 26, and so the external wall has opposed circular apertures which are centred on the longitudinal axis of the cleaning tool 14 to allow the base section 88 of the stem 26 to pass therethrough.

The fluid reservoir 34 further comprises an inner wall 112 which is connected to the external wall, and which with the external wall defines the capacity of the fluid reservoir 34. The inner wall 112 is tubular in shape. The ends of the inner wall 112 are preferably circular in shape, and are connected to the external wall so as to form a fluid-tight seal between the external wall and the inner wall 112. In this embodiment, the fluid reservoir 34 is formed from two housing parts. A first housing part 114 comprises an upper section of the external wall and the inner wall 112, and so the upper end of the inner wall 112 is integral with an upper section of the external wall. A second housing part 116 comprises a lower section of the external wall and the bottom wall 78 of the fluid reservoir 34.

To mount the fluid reservoir 34 on the stem 26, the circular aperture formed in the first housing part 114 of the fluid reservoir 34 is aligned with the free end of the base section 88 of the stem 26, and the fluid reservoir 34 is pushed on to the stem 26. The internal surface of the inner wall 112 of the fluid reservoir 34 bears against the base section 88 of the stem 26 so that frictional forces therebetween prevent the fluid reservoir 34 from falling from the stem 26. To mount the cleaning tool 14 on the handle 12, the spigot 70 of the handle 12 is aligned with the recess 73 formed in the connector 72 of the cleaning tool 14, and the handle fluid outlet port 82 located adjacent to the spigot 70 is aligned with the cleaning tool fluid inlet port 86 of the cleaning tool 14. The cleaning tool 14 is then pushed on to the spigot 70 so that the handle fluid outlet port 82 connects to the cleaning tool fluid inlet port 86, and so that the fluid reservoir 34 engages the annular seat 76 to connect the reservoir fluid outlet port 80 to the fluid inlet 44 of the fluid delivery system 40. The internal surface of the connector 72 of the stem 26 bears against the external surface of the spigot 70 so that frictional forces therebetween retain the stem 26 on the handle 12. The connector 72 is preferably formed from resilient plastics material which flexes as the connector 72 is pushed on to the spigot 70 to increase the frictional forces therebetween. A spring clip 120 may be provided at least partially about the connector 72 for urging the internal surface of the connector 72 against the spigot 70.

The first part 68 of the fluid delivery system 40 is illustrated in FIGS. 6 to 14. As mentioned above, the first part 68 of the fluid delivery system 68 includes the pump 48 and the motor 50. The pump 48 comprises a pump manifold 130 in which the fluid inlet 56 and the fluid outlet 60 are formed. The pump manifold 130 is connected to a pump housing 132 which defines a chamber 134 for receiving fluid through the fluid inlet 56, and from which fluid is ejected through the fluid outlet 60. The pump 48 comprises a fluid displacement member which is moveable relative to the chamber 134 to draw fluid into the chamber 134 and to urge fluid from the chamber 134 towards the accumulator 62. The fluid displacement member is preferably reciprocally moveable relative to the chamber 134.

In this embodiment, the pump 48 is in the form of a double acting piston pump, in which the fluid displacement member is a piston 136 located in the chamber 134. Alternatively, the pump 48 may be in the form of a diaphragm pump, in which the fluid displacement member is a diaphragm extending across the chamber 134. In such a pump, the diaphragm is moveable, through flexing thereof, between different configurations to pump fluid into and from the chamber 134.

Figure 10:
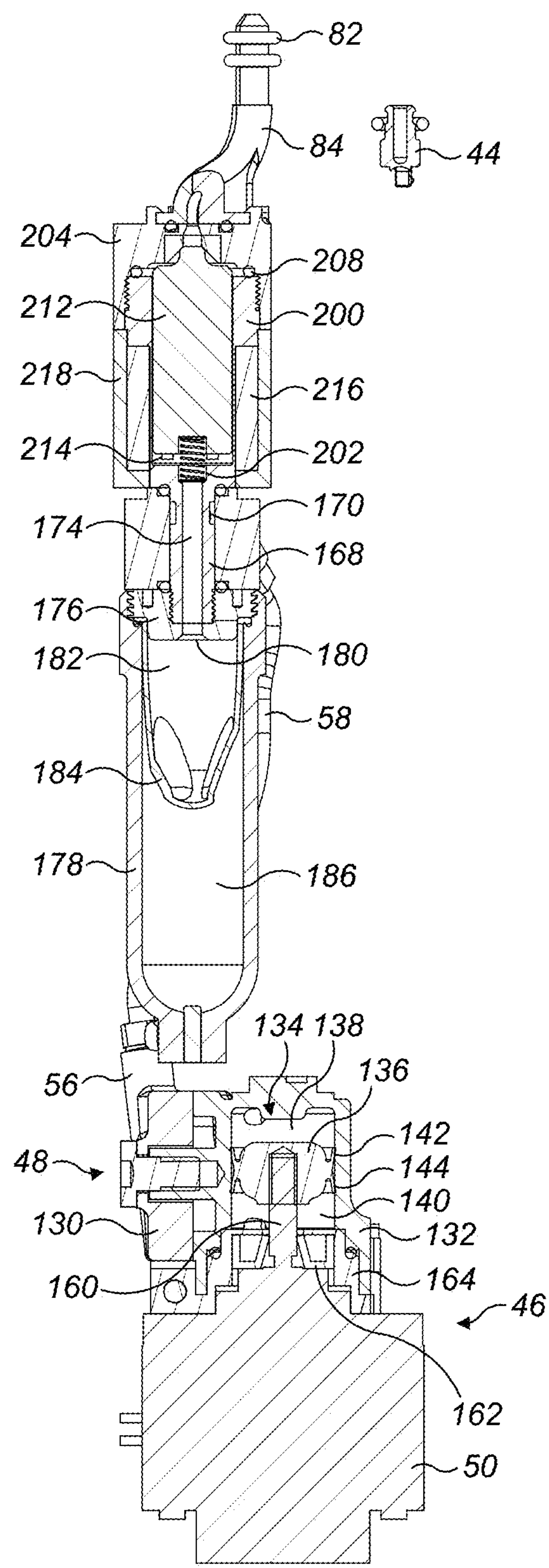
FIG. 10 is a sectional view taken along line D-D in FIG. 7.
Figure 11:
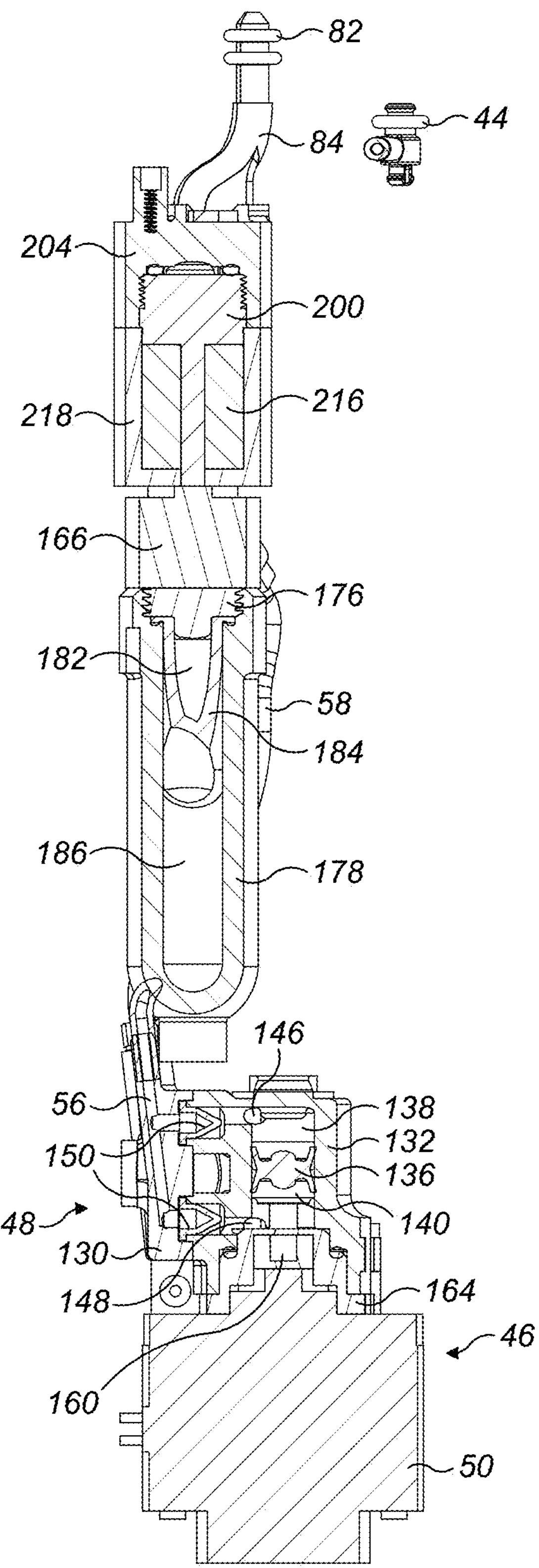
FIG. 11 is a sectional view taken along line E-E in FIG. 7.
Figure 12:
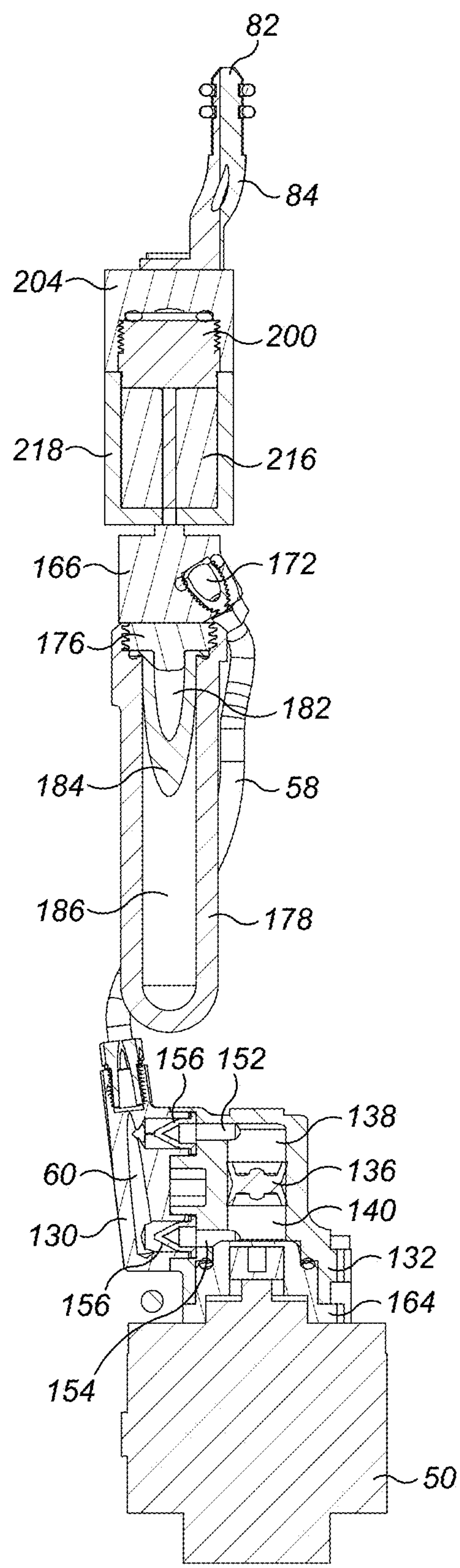
FIG. 12 is a sectional view taken along line F-F in FIG. 7.
Figure 13:
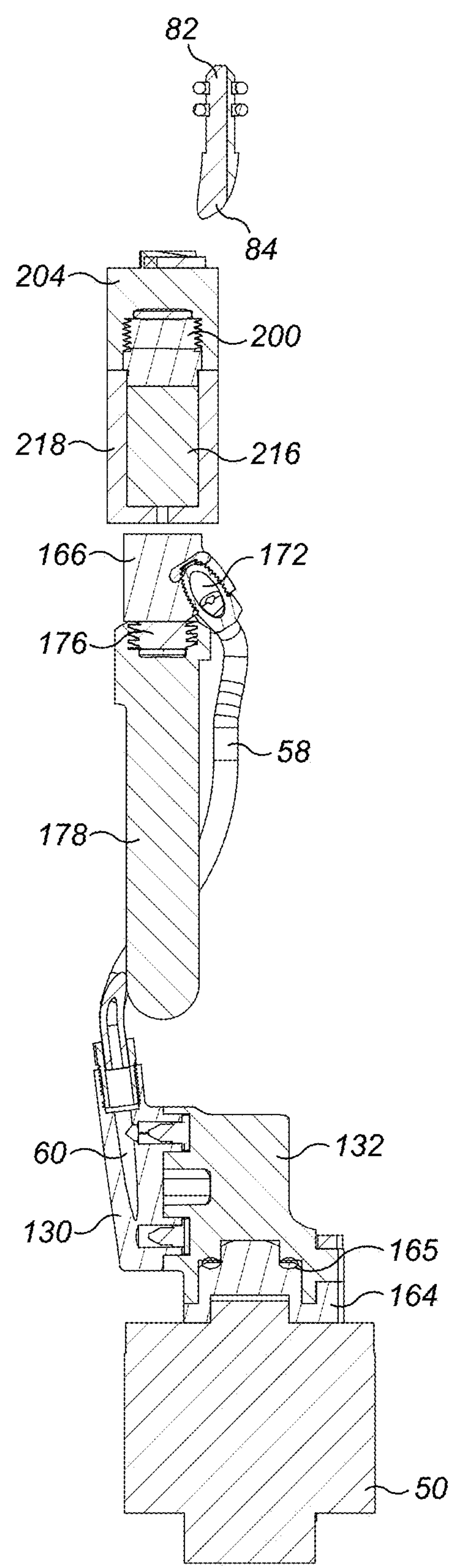
FIG. 13 is a sectional view taken along line G-G in FIG. 7.

With reference to FIG. 10, the piston 136 divides the chamber 134 into a first fluid chamber 138 and a second fluid chamber 140. A first piston seal 142 extends about the piston 136 to form a fluid-tight seal between the piston 136 and the first fluid chamber 138. A second piston seal 144 extends about the piston 136 to form a fluid-tight seal between the piston 136 and the second fluid chamber 140 and the piston 136. In this embodiment, the piston seals 142, 144 are in the form of self-engaging seals extending about the piston 136. With reference to FIG. 11, each of the fluid chambers 138, 140 has a respective fluid inlet port 146, 148 for receiving fluid from the fluid inlet 56 of the pump 48. A one-way valve 150 is located between the fluid inlet 56 and each of the fluid inlet ports 146, 148 or preventing fluid from returning to the fluid inlet 56 from the chamber 134. With reference to FIG. 12, each of the fluid chambers 138, 140 has a respective fluid outlet port 152, 154 for conveying fluid to the fluid outlet 60 of the pump 48. A one-way valve 156 is located between the fluid inlet 56 and each of the fluid outlet ports 152, 154 for preventing fluid from returning to the chamber 134 from the fluid outlet 60. Each of the one-way valves 152, 156 is preferably in the form of a duckbill valve.

The motor 50 is a stepper motor, and in this embodiment is a linear stepper motor which drives a linear actuator, in the form of a drive rod 160, to move the piston 136 reciprocally along a linear path towards and away from the motor 50. As the piston 136 moves towards the motor 50, fluid is drawn into the first fluid chamber 138 from the fluid inlet 56 through fluid inlet port 146. Simultaneously, fluid is urged from the second fluid chamber 140 into the fluid outlet 60 through fluid outlet port 154. As the piston 136 moves away from the motor 50, fluid is urged from the first fluid chamber 138 into the fluid outlet 60 through fluid outlet port 152. Simultaneously, fluid is drawn into the second fluid chamber 140 from the fluid inlet 56 through fluid inlet port 148. An annular shaft seal 162 extends about the drive rod 160 to prevent fluid from leaking from the chamber 134 about the drive rod 160. The shaft seal 162 is disposed within a shaft seal housing 164 located between the motor 50 and the pump housing 132. An O-ring seal 165, indicated in FIG. 13, forms a seal between the pump housing 132 and the shaft seal housing 164.

Figure 14:
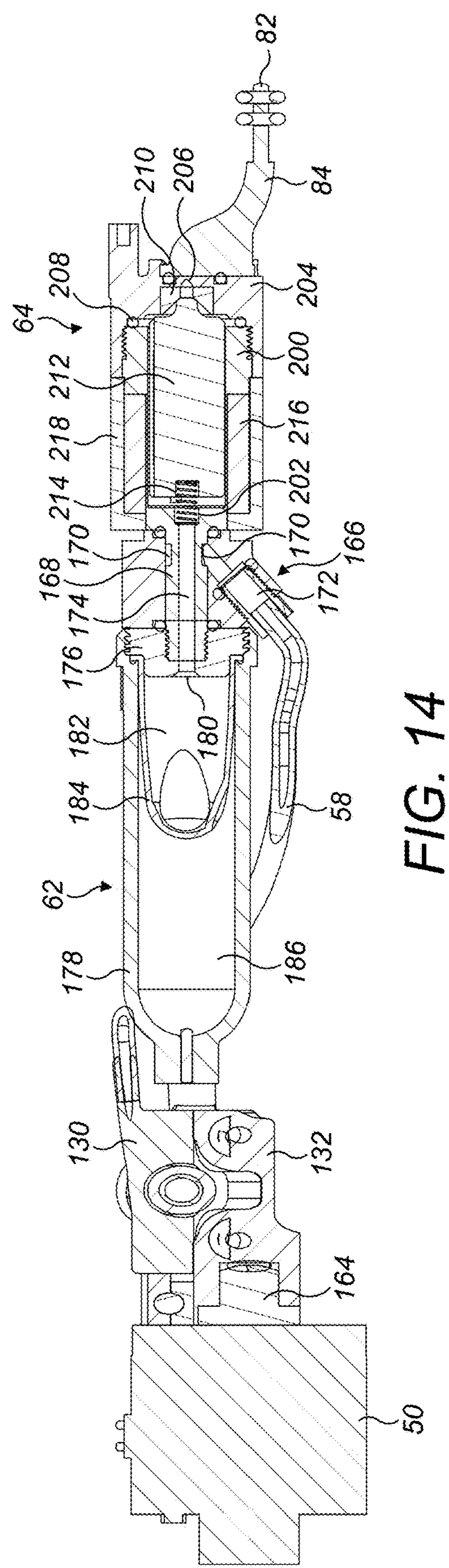
FIG. 14 is a sectional view taken along line H-H in FIG. 9.
Figure 16:
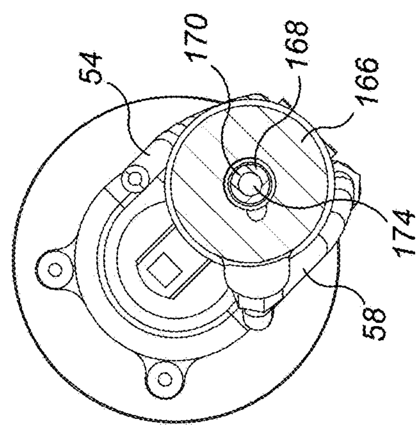
FIG. 16 is a sectional view taken along line L-L in FIG. 9

Returning to FIG. 6, the second conduit 58 is arranged to convey fluid from the fluid outlet 60 to a banjo fitting 166 located between the accumulator 62 and the solenoid valve 64. With particular reference to FIGS. 14 and 16, the banjo fitting 166 comprises a hollow bolt 168 having a fluid inlet port 170 for receiving fluid from an outlet 172 from the second conduit 58, and for conveying the received fluid into the bore 174 of the bolt 168. A threaded end of the bolt 168 is connected to an end cap 176 of the accumulator 62. The end cap 176 is connected to a housing 178 of the accumulator 62.

In this embodiment, the accumulator 62 is in the form of a gas-charged accumulator. The accumulator 62 comprises a fluid port 180 formed in the end cap 176 for receiving working fluid from one end of the bore 174 of the bolt 168, and for conveying the received working fluid to a fluid chamber 182 of the housing 178. The fluid chamber 182 is delimited by an elastic diaphragm 184 which is urged by a gas-filled chamber 186 towards the fluid port 180, and thus in a direction which urges working fluid from the fluid chamber 182 back through the fluid port 180.

Figure 15:
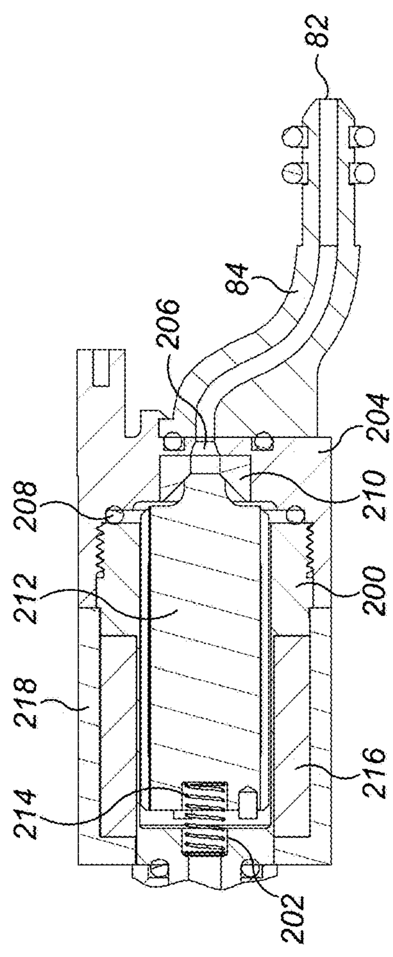
FIG. 15 is a sectional view taken along line J-J in FIG. 9.

The solenoid valve 64 comprises a core housing 200 which is preferably integral with the bolt 168 of the banjo fitting 168. With reference also to FIG. 15, the other end of the bore 174 of the bolt 168 provides a fluid inlet 202 of the solenoid valve 64, and a lower valve housing 204 which comprises a fluid outlet 206 from which fluid passes to the third conduit 84 located in the handle 12. An O-ring 208 forms a seal between the core housing 200 and the lower valve housing 204. The lower valve housing 204 houses a valve seat 210 against which a core 212 is urged by a spring 214 located between the bolt 168 and the core 212. A coil 216 is located around the core housing 200, and a flux conductor 218 is located around the coil 216. The coil 216 is connected to the control circuit 66, which selectively energizes the coil 216 to generate a magnetic field which pulls the core 212 away from the valve seat 210, and so actuate a transition of the solenoid valve 64 from a closed position, as illustrated in FIG. 14, to an open position to allow working fluid to pass from the fluid inlet 202 and around the core 212 to the fluid outlet 206. When the coil 216 is de-energised, the spring 214 urges the core 212 against the valve seat 210 to place the solenoid valve 214 in a closed position.

Figure 17:
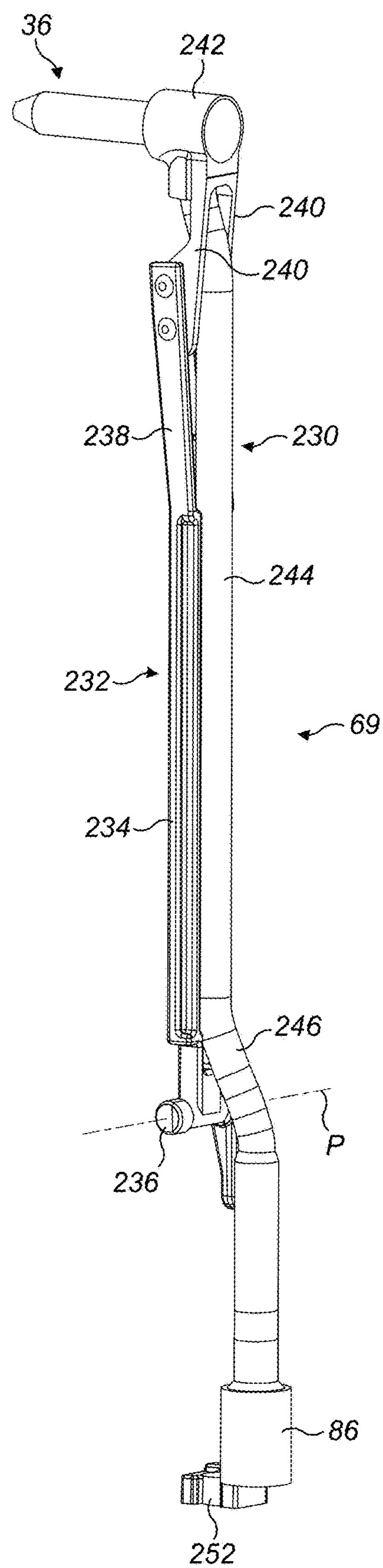
FIG. 17 is a perspective view of a second part of the fluid delivery system which is located in the cleaning tool of the appliance.

Turning to FIG. 17, the cleaning tool fluid inlet port 86 provides a fluid inlet of the second part 69 of the fluid delivery system 40 which is located in the cleaning tool 14. This second part 69 of the fluid delivery system comprises a fluid conduit 230 for conveying fluid from the cleaning tool fluid inlet port 86 to the nozzle 36. The nozzle 36 is mounted on a support 232 which supports the nozzle 36 for movement relative to the handle 12 and to the stem 26 of the cleaning tool 14. The support 232 comprises an elongate body 234 which is connected to the stem 26 for pivoting movement about a pivot axis P. For example, the support 232 may comprise a cylindrical boss 236 which is retained between a pair of spaced recesses formed in the base 88 of the stem 26. Pivot axis P passes through the stem 26, and is substantially orthogonal to the longitudinal axis of the stem 26. The support 232 is generally Y-shaped, having a pair of arms 238 which extend upwardly from the body 234 and which are each connected to a respective leg 240 of the body 242 of the nozzle 36. The fluid conduit 230 passes between the legs 240 of the body 242 of the nozzle 36 to connect to a fluid inlet of the nozzle 36.

Figure 18A:
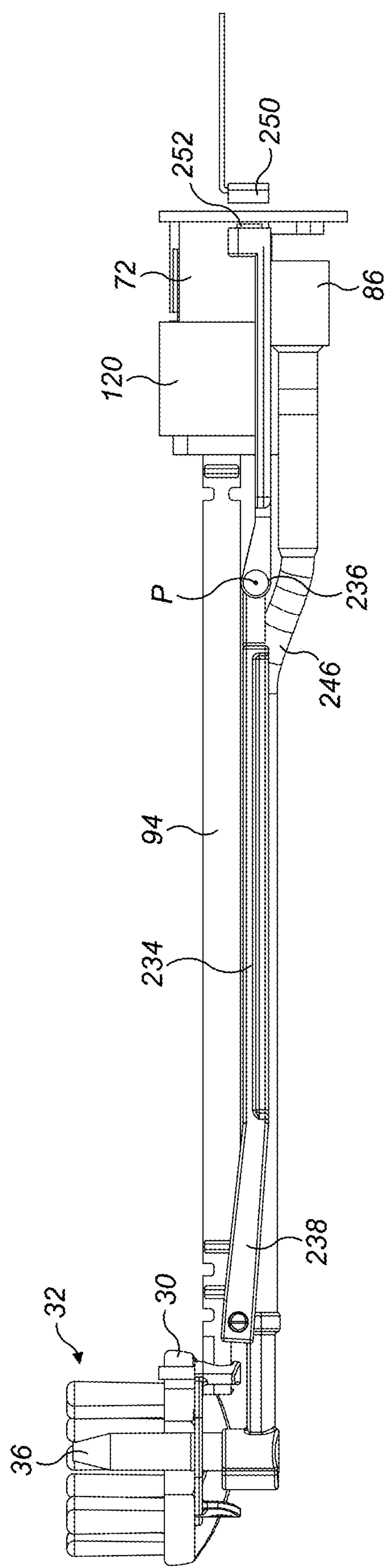
FIG. 18(*a*) is a side view of the position of the second part of the fluid delivery system relative to a sensor in the handle with the nozzle in a distal position relative to the cleaning tool, and FIG. 18(*b*) is a similar view to FIG. 18(*a*) with the nozzle in a proximal position relative to the cleaning tool.
Figure 18B:
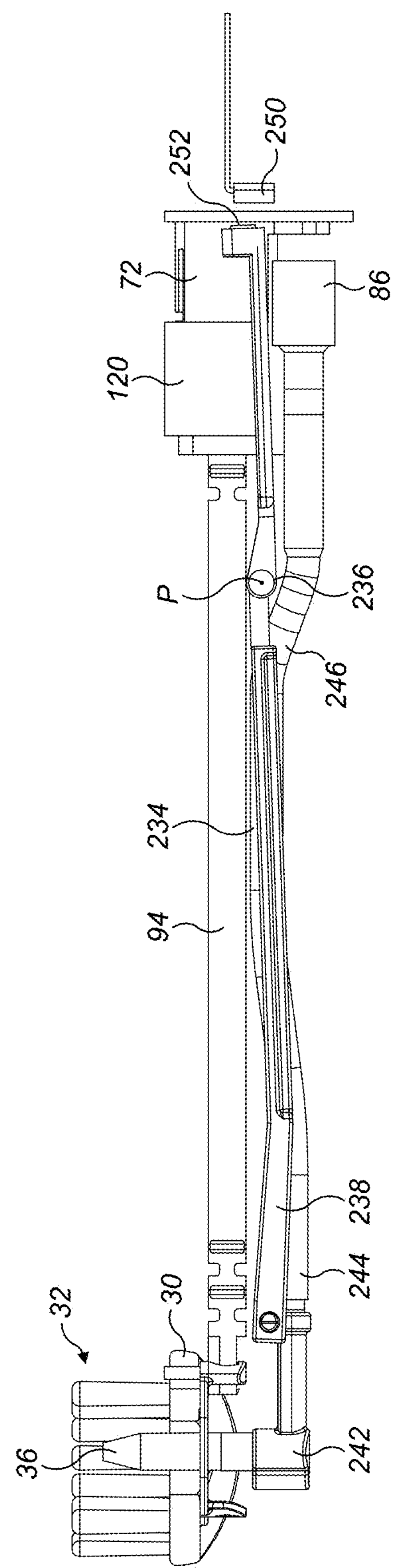

The nozzle 36 is moveable relative to the handle 12 between a first, or distal, position, as shown in FIG. 18(*a*), and a second, or proximal, position, as shown in FIG. 18(*b*). In the distal position, the tip of the nozzle 36 protrudes outwardly beyond the ends of the bristles 32, whereas in the proximal position, the tip of the nozzle 36 is retracted relative to the ends of the bristles 32. In this embodiment, the nozzle 36 is biased for movement towards the distal position. The fluid conduit 230 comprises a relatively rigid section 244 which is connected to the nozzle 36, and a relatively flexible section 246 located between the relatively rigid section 244 and the cleaning tool fluid inlet port 86, and which is housed within the stem 26 so as to be in an elastically deformed configuration. The internal force created within the relatively flexible section 246 of the fluid conduit 230 causes the nozzle 36 to pivot about the pivot axis P in such a direction that urges the nozzle 36 towards the distal position relative to the brush unit 29.

A sensor 250 is provided for detecting movement of the support 232, and thus movement of the fluid conduit 230 and the nozzle 36 which move with the support 232, relative to the handle 12 and the stem 26 of the cleaning tool 14. The sensor 250 is connected to the control circuit 66. In this embodiment, the sensor 250 is in the form of a Hall effect sensor which detects the movement of a magnet 252 connected to the end of the support 232 which is remote from the nozzle 36, and which generates an output having a voltage which is dependent on the relative positions of the sensor 250 and the magnet 252. The control circuit 66 is configured to receive the output from the sensor 250, and to sample that output every 10 ms, or at a frequency of 100 Hz, to generate a sampled output, or sampled voltage, S, every 10 ms.

From the sampled outputs received every 10 ms, the control circuit 66 is configured to generate the rate of change, Sr, of the sampled outputs from the difference between consecutive sampled outputs. Thus, the control circuit is configured to calculate a value for Sr every 10 ms.

The control circuit 66 is further configured to determine an average rate of change of the sensor output, Sa, by calculating the average value of the 10 most recent values of Sr. A value for Sa is thus also calculated every 10 ms from the values of Sr calculated during the preceding 100 ms time period.

In use, the user first fills the fluid reservoir 34 with working fluid, which in this embodiment is water. With the closure member 102 in the open position, the user may place the appliance 10 beneath the spout of a tap and turn on the tap so that water from the spout enters the exposed fluid inlet port 100 of the fluid reservoir 34. As at least part of the external wall of the fluid reservoir 34 is transparent, the user can observe the filling of the fluid reservoir 34. When the fluid reservoir 34 is full, the user returns the closure member 102 to the closed position to seal the fluid inlet port 100.

The user switches on the appliance 10 by depressing button 18, the action of which is detected by the control circuit 66. The user can then select a mode of operation of the appliance 10 by depressing button 20. For example, the user may choose to activate the movement of the brush unit by depressing button 20. The currently selected mode of operation of the appliance 10 is displayed on the display, and the user can toggle between the various selectable modes of operation by depressing button 20 until the desired operational mode is displayed on the display. In this embodiment, there are six different user selectable operational modes:

| MODE | BRUSHING | MANUAL JET | AUTO JET |
|---|---|---|---|
| 1 | ON | OFF | OFF |
| 2 | ON | ON | OFF |
| 3 | ON | OFF | ON |
| 4 | OFF | ON | OFF |
| 5 | OFF | OFF | ON |
| 6 | ON | ON | ON |

When any of modes 1 to 3 or 6 are selected, the control circuit 66 activates the motor to move the brush unit relative to the handle 12 to brush teeth.

When any of modes 2 to 6 are selected, initially the control circuit 66 operates the motor 50 to activate the pump 48 to charge the accumulator 62. With the solenoid valve 64 in a closed position, the pump 48 is activated to draw a volume of water from the fluid reservoir 34, and to convey that volume of drawn water to the accumulator 62. As water is received by the fluid chamber 182 of the accumulator 62, the pressure of the water stored within the fluid chamber 182, and thus the pressure of the fluid conveyed to the accumulator 62 by the pump 48, increases. This in turn increases the load on the motor 50 which is driving the pump 48 to convey water to the accumulator 62. As mentioned above, in this embodiment the motor 50 is a stepper motor, preferably a linear stepper motor. The motor 50 will stall when the torque on the motor as it pumps water to the accumulator 62 exceeds an operating limit of the motor 50, which is determined by the design limits of the motor and a current limit set at the motor controller of the control circuit 66. In this embodiment, the motor 50 stalls when the pressure of the pumped fluid is around 6.5 bar (around 650 kPa). The motor controller of the control circuit 66 detects the stalling of the motor 50 from a voltage generated by the motor 50, specifically from measuring the back electromotive force, or back EMF, across a coil or coils of the motor 50. When the stalling of the motor 50 has been detected by the motor controller of the control circuit 66, the control circuit 66 stops the operation of the motor 50 to deactivate the pump 48. In this embodiment, the volume of water which is received by the accumulator each period of time that the pump 48 is activated is around 0.25 ml. The second one-way valves 156 prevent water from returning to the chamber 134 of the pump 48 from the accumulator 62.

When mode 2, mode 4 or mode 6 is selected by the user, a burst of water is emitted from the nozzle 36 in response to user depression of the button 22. The depression of the button 22 is detected by the control circuit 66. The control circuit 66 activates the coil 216 of the solenoid valve 64 to move the solenoid valve 64 to the open position. This allows the diaphragm 184 of the accumulator 62 to move rapidly towards the fluid port 180 to urge the volume of water out from the accumulator 62 in the form of a pressurised burst of water. The time taken to urge that volume of water from the accumulator 62 is preferably in the range from 1 to 50 ms, and in this embodiment is around 30 ms. The burst of water passes though the solenoid valve 64 and the fluid conduits 84, 230 to be ejected from the fluid outlet 42 of the nozzle 36. When the nozzle 36 is positioned within or aligned with an interproximal gap, the burst of water ejected from the nozzle 36 can dislodge matter located within the interproximal gap.

The control circuit 66 is arranged to replenish the accumulator 62 following the delivery of the burst of water to the nozzle 36. The control circuit 66 is arranged to move the solenoid valve 64 to the closed position, and to operate the motor 50 to activate the pump 48 to convey another volume of water from the fluid reservoir 34 to the accumulator 62. The control circuit 66 is configured to disable the opening of the solenoid valve 64, in response to the user depression of the button 22, until the accumulator 62 has become fully replenished with water, and so preferably for a period of around 500 ms after the last burst of water was ejected from the nozzle 36.

When mode 3, mode 5 or mode 6 is selected by the user, a burst of water is emitted from the nozzle 36 depending on an output from the sensor 250. Thus, when mode 6 is selected, a burst of water is emitted from the nozzle 36 depending on an output from the sensor 250 or in response to user depression of the button 22. As the brush unit is moved across the user's teeth, the tip of the nozzle 36 engages the user's teeth. The force that is applied to the nozzle 36 as the nozzle 36 is pushed against the user's teeth overcomes the biasing force applied to the nozzle 36 by the third fluid conduit 230, and so the nozzle 36 moves away from the distal position towards its proximal position. As the brush unit is moved across the user's teeth, the position of the nozzle 36 relative to the stem 26 will vary depending on the contours of the teeth and the force with which the head 28 is pressed against the teeth.

The control circuit 66 is initially in a first, or "unprimed", condition. As the brush unit passes from one tooth to an adjacent tooth, the nozzle becomes positioned over the interproximal gap between those teeth. In that position, the force acting on the nozzle 36, through its engagement with the teeth of the user, is removed. This allows the fluid conduit 230 to urge the support 234 to pivot about the pivot axis P, which moves the nozzle 36 rapidly towards its distal position. This movement of the third fluid conduit 230 causes the support 234 to move about the pivot axis P, which in turn causes the magnet 252 to move rapidly, relative to the sensor 250, towards the position shown in FIG. 18(*a*).

This generates a rapid variation in the signal output from the sensor 250 to the control circuit 66, and thus a relatively large change in the value of Sa calculated by the control circuit 66. In this embodiment, Sa has a relatively large negative value when the nozzle 36 moves rapidly towards its distal position. When the value of Sa falls below a first threshold value, which occurs when the tip of the nozzle 36 enters an interproximal gap, the control circuit 66 enters a second, or "primed", condition.

With the tip of the nozzle 36 now located within the interproximal gap, the value of Sa increases rapidly. This can be to a value of approximately zero, or to a value greater than zero as the nozzle 36 moves away its distal position, as shown in FIG. 18(*b*), as the tip of the nozzle 36 begins to move over the adjacent tooth.

When the value of Sa subsequently rises above a second threshold value, which is greater than the first threshold value, the control circuit 66 enters a third, or "ejection", condition in which the control circuit 66 activates the coil 216 of the solenoid valve 64 to open the solenoid valve 64. As described above, the opening of the solenoid valve 64 causes a burst of water to be ejected from the nozzle 36 into the interproximal gap between the teeth.

Following the delivery of the burst of water to the nozzle 36, the control circuit 66 is arranged to replenish the accumulator 62. The control circuit 66 is arranged to move the solenoid valve 64 to the closed position, and to operate the pump 48 to convey another volume of water from the fluid reservoir 34 to the accumulator 62. The control circuit 66 is configured to disable the opening of the solenoid valve 64 in response to the output received from the sensor 250, until the accumulator 62 has become fully replenished with water, and so for a period of around 500 ms after the last burst of water was ejected from the nozzle 36. Once the accumulator 62 has been replenished, the control circuit 66 returns to its first, or "unprimed", condition.

The appliance 10 may be configured to reduce the risk of undesired ejection of bursts of working fluid when the nozzle 36 is not located within an interproximal gap of the user, for example during handling of the appliance 10, when any of mode 2, mode 3 or mode 6 has been selected by the user. In each of these modes, the motor is activated to move the bristle carrier 30 relative to the handle 12. To maintain a constant speed of movement of the bristle carrier 30 relative to the handle 12, the motor may draw a variable amount of current, the magnitude of the drawn current varying as a resistance is applied to the motion of the brush unit about the nozzle 36. The magnitude of the current drawn by the motor can thus provide an indication that the brush head is being pressed against a user's teeth.

The control circuit 66 may be configured to monitor the current which is drawn by the motor for moving the bristle carrier 30 relative to the handle 12. When the current drawn by the motor is below a pre-set threshold value, this can provide an indication that the brush unit is not being used to clean a user's teeth, for example, when the appliance 10 has first been switched on by the user, or if the fluid reservoir 34 is being replenished by the user while the appliance 10 is switched on. In this event, the appliance 10 enters a first operational mode, in which the delivery of a burst of water to the teeth of a user is inhibited, irrespective of whether the button 22 is depressed (in mode 2 or mode 6) or the output from the sensor 250 (in mode 3 or mode 6).

When the current drawn by the motor is above the pre-set threshold value, this can provide an indication that the brush unit is being used to clean a user's teeth. In this event, the appliance 10 enters a second operational mode, in which the delivery of a burst of water to the teeth of a user is permitted. The current drawn by the motor is continuously monitored by the control circuit 66, and the control circuit 66 is arranged to effect a transition between the first operational mode and the second operational mode automatically as the detected current falls below, or rises above, the threshold value.

A second, higher, threshold value may also be pre-set in the control circuit 66. When the current drawn by the motor exceeds this second threshold value, the control circuit 66 may generate an alert, for example, an audible alert or a visual alert displayed on the display, to warn the user that the brush unit is being pressed too firmly against the user's teeth.

In the above embodiment, the capacity of the fluid chamber 182 of the accumulator 62 is substantially the same as the volume of a single burst of working fluid. However, the capacity of the fluid chamber 182 may be larger than the volume of a single burst of working fluid.

In a second embodiment, the fluid chamber has a capacity of 0.75 ml, and a single burst of working fluid has a volume of around 0.25 ml. In this second embodiment, when in its third condition the control circuit 66 is arranged to hold the solenoid valve 64 in an open position for a time period which allows only the required volume of working fluid to be ejected from the accumulator 62 to form a single burst of working fluid. For example, the solenoid valve 64 may be held in an open position for a time period of 30 ms to allow a single burst of working fluid having a volume of 0.25 ml to be delivered to the nozzle 36. The control circuit 66 returns to its first condition following the ejection of that single burst of working fluid. In this case, and provided that there is sufficient working fluid in the accumulator 62 to deliver those three bursts of working fluid to the nozzle 36, the control circuit 66 is arranged to replenish the accumulator 62 following the delivery of every third burst of working fluid to the nozzle 36.

In a third embodiment, the fluid chamber has a capacity of 0.25 ml, and a single burst of working fluid has a volume of around 0.08 ml. Similar to the second embodiment, in this third embodiment the control circuit 66 is arranged to hold the solenoid valve 64 in an open position for a time period which allows only the required volume of working fluid to be ejected from the accumulator 62 to form a single burst of working fluid. For example, the solenoid valve may be held in an open position for a time period of around 10 ms to allow a single burst of working fluid having a volume of 0.08 ml to be delivered to the nozzle 36. Again, in this case the control circuit 66 is arranged to replenish the accumulator 62 following the delivery of every third burst of working fluid to the nozzle 36, but the time required to replenish the accumulator 62 in this third embodiment is shorter than the time required to replenish the accumulator 62 in the second embodiment.

In each of the first to third embodiments, the control circuit 66 is arranged to deliver a single burst of working fluid depending on a received input, such as the depression of the button 22. However, the control circuit 66 may be arranged to deliver a series of bursts of working fluid depending on such a received input. Each of the bursts of working fluid within a series preferably contains substantially the same volume of working fluid.

In a fourth embodiment, the fluid chamber 182 of the accumulator 62 has a capacity of 0.25 ml, and the control circuit 66 is arranged to control the fluid delivery system 100 to deliver a single series of three bursts of working fluid, each having a volume of around 0.08 ml, in response to user depression of the button 22. The depression of the button 22 is detected by the control circuit 66. The control circuit 66 activates the coil 216 of the solenoid valve 64 to move the solenoid valve 64 to the open position. The control circuit 66 holds the solenoid valve 64 in the open position only for a time period which allows the diaphragm of the accumulator 62 to urge a volume of water from the accumulator 62 to form the first pressurized burst of water. In this embodiment, the time taken to urge that volume of water from the accumulator 62 is around 10 ms, and so after that period of time the control circuit 66 deactivates the coil 216 of the solenoid valve 64 to allow the solenoid valve 64 to move to the closed position.

Once the solenoid valve 64 is in the closed position, the control circuit 66 re-activates the coil 216 of the solenoid valve 64 to move the solenoid valve 64 back to the open position. Again, the control circuit 66 holds the solenoid valve 64 in the open position only for a time period which allows the diaphragm of the accumulator 62 to urge a second volume of water from the accumulator 62 to form the second pressurised burst of water, and so in this embodiment a second time period of around 10 ms.

After that period of time has elapsed, the control circuit 66 deactivates the coil 216 of the solenoid valve 64 to allow the solenoid valve 64 to move to the closed position. Once the solenoid valve 64 is in the closed position, the control circuit 66 again re-activates the coil 216 of the solenoid valve 64 to move the solenoid valve 64 back to the open position. Once again, the control circuit 66 holds the solenoid valve 64 in the open position only for a time period which allows the diaphragm of the accumulator 62 to urge a third volume of water from the accumulator 62 to form the third pressurised burst of water, and so in this embodiment a third time period of around 10 ms. After that period of time has elapsed, the control circuit 66 deactivates the coil 216 of the solenoid valve 64 to allow the solenoid valve 64 to move to the closed position. The pump 48 is then operated to replenish the accumulator 62.

Within a series, the time period between successive bursts of working fluid is preferably equal, and is preferably in the range from 1 to 25 ms, more preferably in the range from 2 to 10 ms, so that the entire series of bursts may be delivered to a single interproximal gap. This can allow for a slight variation in the position of the tip of the nozzle 36 relative to interproximal gap with each successive burst, and so potentially improving the removal of material from within the interproximal gap.

In this fourth embodiment, the capacity of the fluid chamber 182 of the accumulator 62 is substantially the same as the volume of working fluid which is ejected from the nozzle 36 in a single series of bursts of working fluid. Alternatively, the capacity of the fluid chamber 182 of the accumulator 62 may be greater than the volume of working fluid which is ejected from the nozzle 36 in a single series of bursts of working fluid. For example, in a fifth embodiment, the capacity of the fluid chamber 182 is increased to 0.75 ml, but the control circuit 66 is arranged to eject the same, single series of three bursts of working fluid, each having a volume of around 0.08 ml, in response to user depression of the button 22. Therefore, in this fifth embodiment the accumulator 62 requires replenishment following the delivery of three series of bursts of working fluid from the appliance 10.

Figure 19:
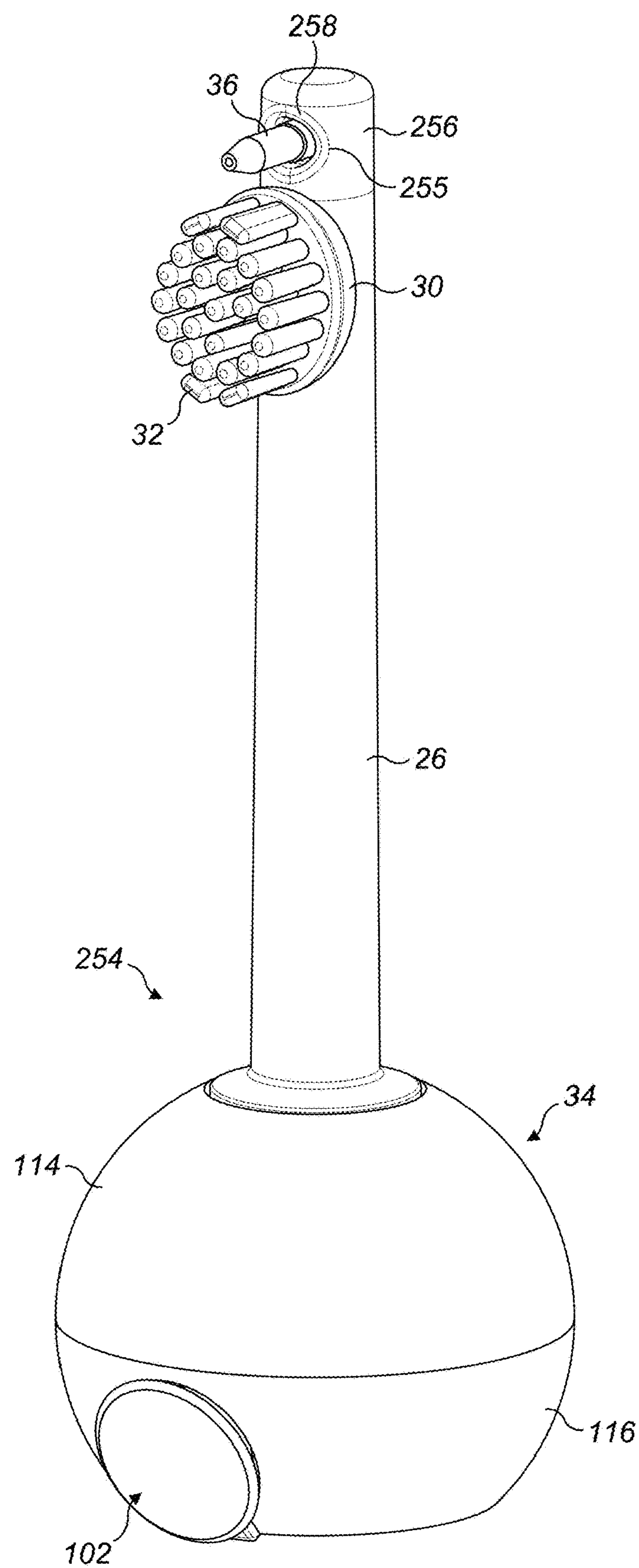
FIG. 19 is a perspective view of a cleaning tool in which a moveable nozzle is located to one side of a brush unit of the tool.

In each of the above first to fifth embodiments, the brush unit extends about the nozzle 36. FIG. 19 illustrates a variation of the cleaning tool 14 in which the nozzle 36 of the cleaning tool 254 is located to one side of the brush unit. In this cleaning tool 255, the brush unit is located between the fluid reservoir 34 and the nozzle 36, with the nozzle 36 being arranged to eject a burst of working fluid along a path which extends to the side of the bristles 32 mounted on the bristle carrier 30. The nozzle 36 extends outwardly from an aperture 255 formed in an upper portion 256 of the stem 26 of the cleaning tool 254 so that the nozzle 36 is moveable relative to the stem 26 between its proximal and distal positions. A flexible seal 258 is provided between the nozzle 36 and the periphery of the aperture 255 to inhibit the ingress of the ejected working fluid into the stem 26 through the aperture 255.

In each of the above first to fifth embodiments, the nozzle 36 moves relative to the handle 12, and the movement of the nozzle 36 relative to the handle 12 is detected by a sensor 250. Alternatively, during use of the appliance the nozzle of the appliance remains stationary relative to the handle 12 and a separate contact member is arranged to move relative to the handle 12, or to the nozzle, as the appliance is moved along the teeth of the user. The sensor 250 provides an output which varies with movement of the contact member relative to the nozzle, or to the handle 12, and the control circuit 66 actuates the delivery of working fluid to the teeth of the user depending on the output from the sensor.

Figure 20:
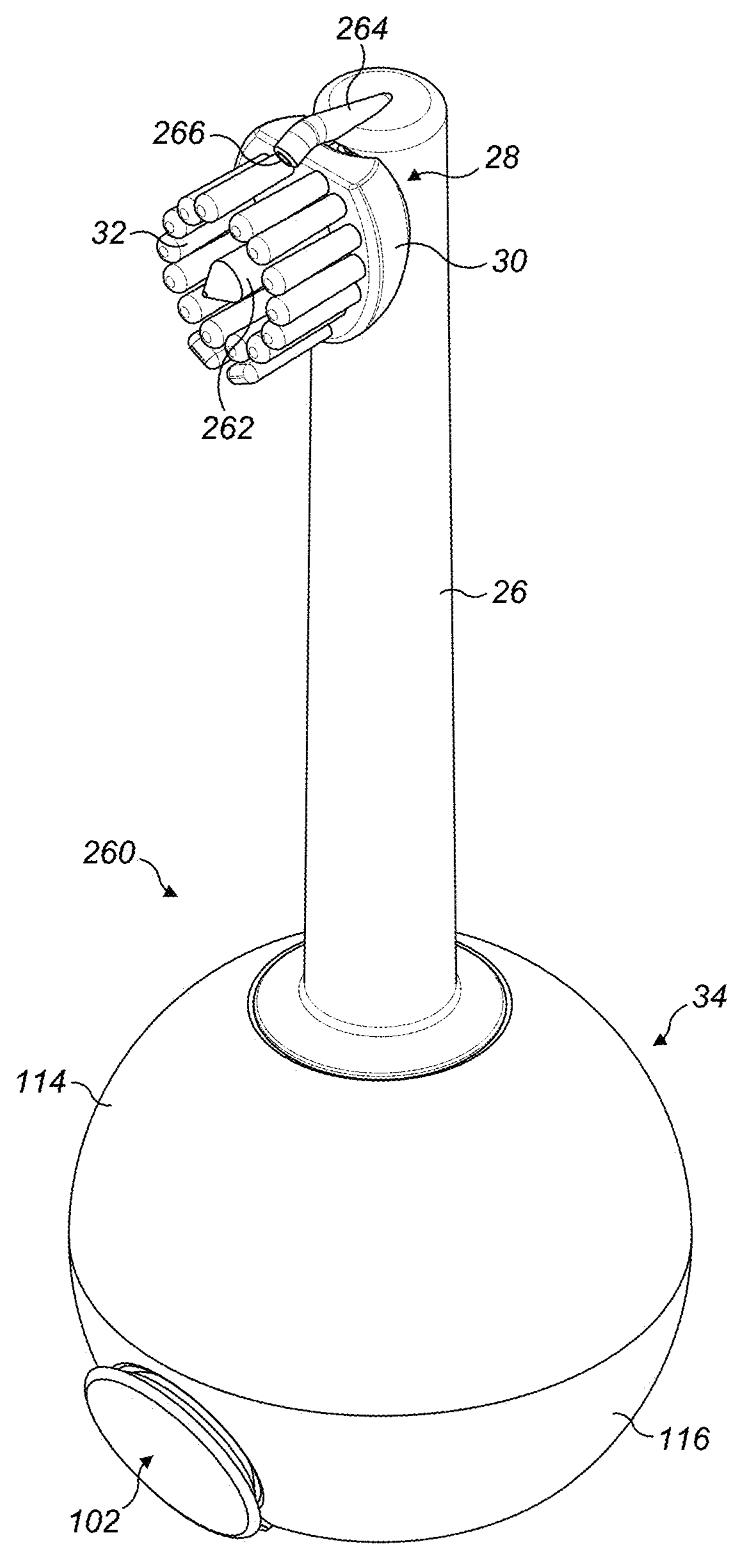
FIG. 20 is a perspective view of a cleaning tool comprising a first alternative for the second part of the fluid delivery system.
Figure 21:
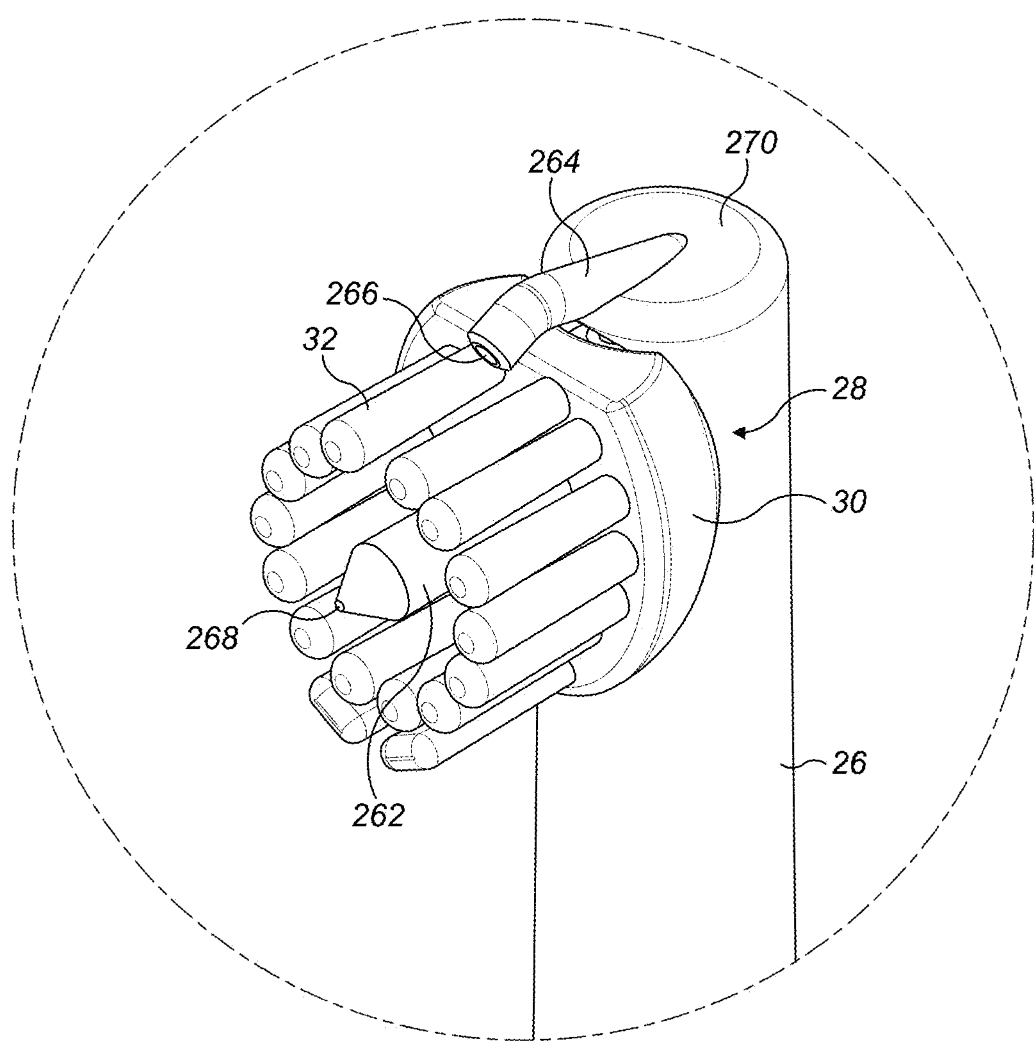
FIG. 21 is a close up of the head of the cleaning tool of FIG. 20.

FIGS. 20 and 21 illustrate a first alternative cleaning tool 260 for attachment to the handle 12, in which a contact member 262 of the cleaning tool 260 is moveable relative to the nozzle 264 of the cleaning tool 260. Features of the cleaning tool 260 which are the same as those of the cleaning tool 14 have been identified using the same reference numerals, and will not be described again in detail. The contact member 262 is located in the head 28 of the cleaning tool 260 such that the annular bristle carrier 30 extends around the contact member 262, and preferably such that the bristle carrier 30 is centred on the longitudinal axis of the contact member 262. The nozzle 264 is located adjacent to the bristle carrier 30, in this embodiment such that the bristle carrier 30 is located between the nozzle 264 and the fluid reservoir 34. Alternatively, the nozzle 264 may be located between the bristle carrier 30 and the fluid reservoir 34. The nozzle 264 is preferably shaped so that a burst of working fluid ejected from the fluid outlet 266 is directed towards a target area located beyond the tip 268 of the contact member 262. The bristles 32 are arranged on the bristle carrier 30 so that, as the bristle carrier 30 moves relative to the stem 26, the bristles 32 do not interfere with a burst of working fluid emitted from the nozzle 264. In this embodiment, the nozzle

264 is arranged to eject a burst of working fluid between two adjacent tufts of bristles 32, but alternatively the nozzle 264 may be arranged to eject a burst of working fluid along a path which extends to the side of the bristles. In this embodiment, the body 270 of the nozzle 264 is connected to the end of the stem 26 of the cleaning tool 260.

Figure 22:
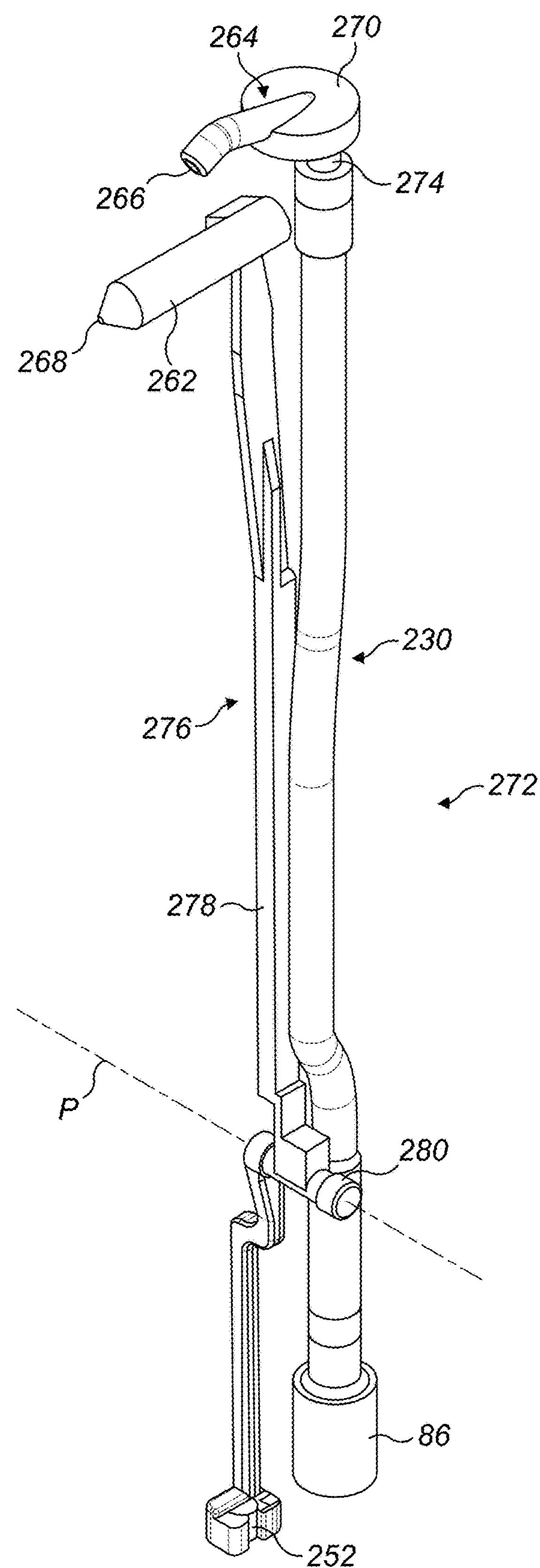
FIG. 22 is a perspective view of the first alternative for the second part of the fluid delivery system which is located in the cleaning tool of the appliance.

The nozzle 264 forms part of a first alternative for the second part 272 of the fluid delivery system 40 of the appliance, as shown in FIG. 22. The third fluid conduit 230 extends from the cleaning tool fluid inlet port 86 to a fluid inlet 274 of the nozzle 264. The contact member 262 is mounted on a support 276 which supports the contact member 262 for movement relative to the handle 12 and to the nozzle 264 of the cleaning tool 260. The support 276 comprises an elongate body 278 which is connected to the stem 26 for pivoting movement about a pivot axis P. For example, the support 276 may comprise a cylindrical boss 280 which is retained between a pair of spaced recesses formed in the base 88 of the stem 26. Pivot axis P passes through the stem 26, and is substantially orthogonal to the longitudinal axis of the stem 26. The contact member 262 is connected to one end of the support 276, and the magnet 252 is connected to the other end of the support 276.

Figure 23A:
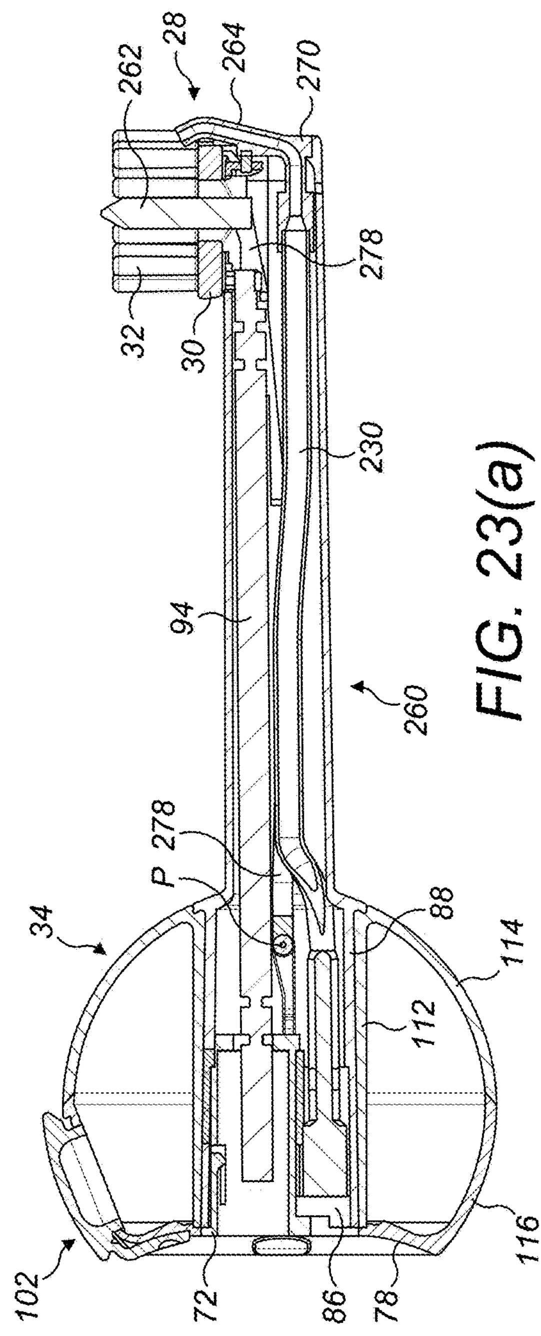
FIG. 23(*a*) is a side view of the position of a cleaning tool comprising the first alternative for the second part of the fluid delivery system, in which a contact member is in a distal position relative to the nozzle, and FIG. 23(*b*) is a similar view to FIG. 23(*a*) with the contact member in a proximal position relative to the nozzle.
Figure 23B:
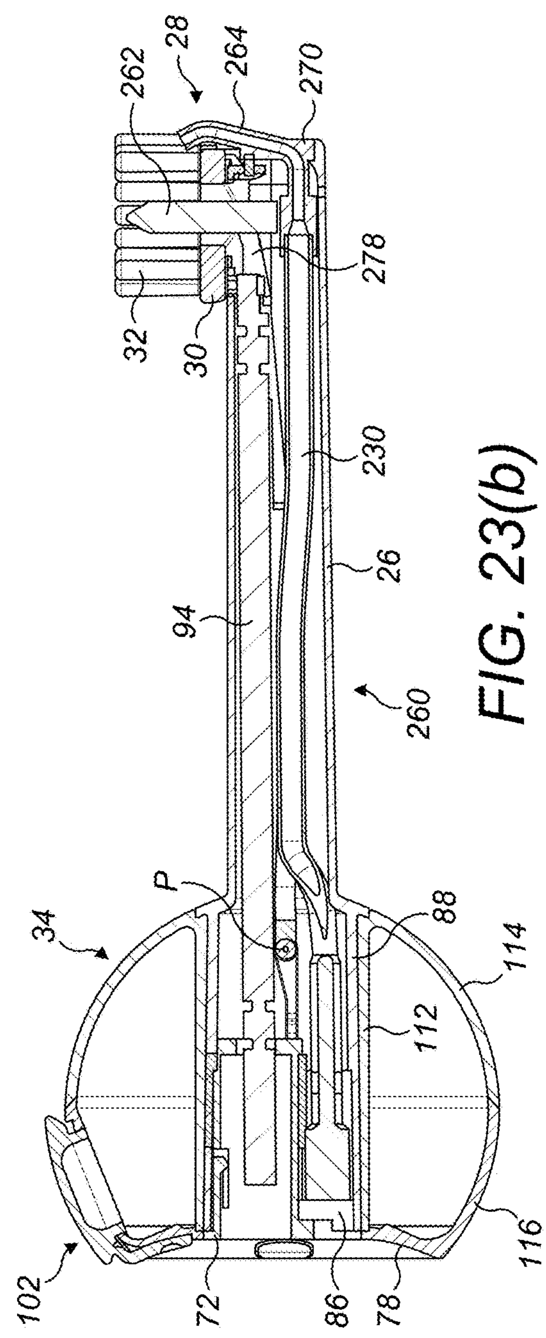

The contact member 262 is moveable relative to the nozzle 262 between a first, or distal, position, illustrated in FIG. 23(*a*), and a second, or proximal, position, illustrated in FIG. 23(*b*). In the distal position, the tip of the contact member 262 protrudes outwardly beyond the ends of the bristles 32, whereas in the proximal position, the tip of the contact member 262 is retracted relative to the ends of the bristles 32. In this embodiment, the contact member 262 is biased for movement towards the distal position. The contact member 262 may be biased for movement towards the distal position by a biasing member, for example a spring or other resilient member, which is located between the support 276 and the stem 26 of the cleaning tool 260. Alternatively, the third fluid conduit 230 may be arranged to engage the support 276 such that the third fluid conduit 230 is maintained in an elastically deformed configuration within the stem 26. The internal force created within the relatively flexible section 246 of the fluid conduit 230 acts upon the support 272 in such a direction so as to cause the support 272 to pivot about the pivot axis P in such a direction that urges the contact member 262 towards the distal position.

In use, as the brush unit is moved across the user's teeth, the tip of the contact member 262 engages the user's teeth. The force that is applied to contact member 262 as the contact member 262 is pushed against the user's teeth overcomes the biasing force applied to the contact member 262 by the third fluid conduit 230, and so the contact member 262 moves away from the distal position towards its proximal position. As the brush unit is moved across the user's teeth, the position of the contact member 262 relative to the nozzle 264 will vary depending on the contours of the teeth and the force with which the head 28 is pressed against the teeth. For user comfort, a tip of the contact member 262 may be formed from relatively flexible material, such as an elastomeric material or a rubber, whereas a base of the contact member 262 may be formed from relatively stiff material, such as a plastics or metallic material. As when the cleaning tool 14 is attached to the handle 12, the movement of the contact member 262 over the teeth of the user causes the magnet 252 to move relative to the sensor 250 located in the handle 12, and, when the user has selected one of mode 3, mode 5 and mode 6, the variation of the magnetic field experienced by the sensor 250 with the movement of the magnet 252 relative to the sensor 250 is used by the control circuit 66 to control the ejection of a burst of working fluid from the nozzle 264.

Figure 24:
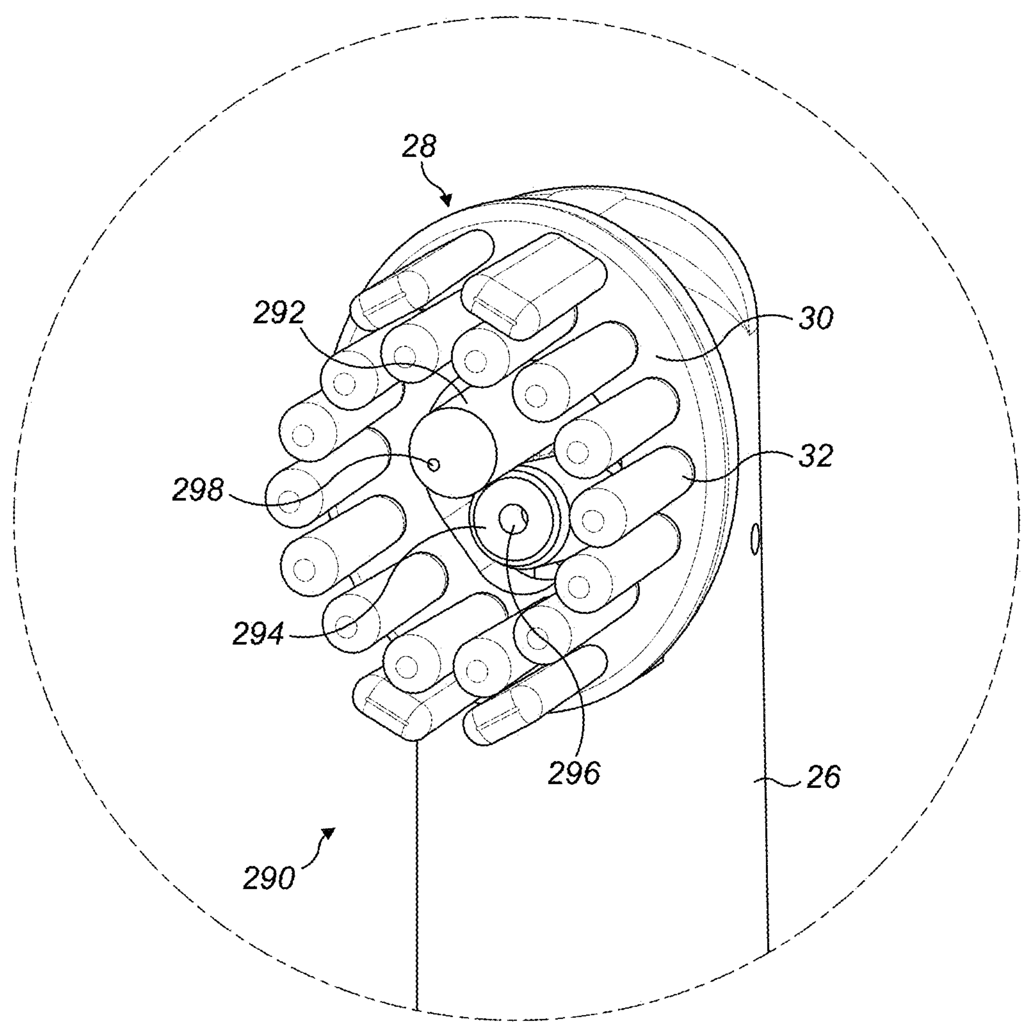
FIG. 24 is a close up of the head of a cleaning tool comprising a second alternative for the second part of the fluid delivery system.
Figure 25:
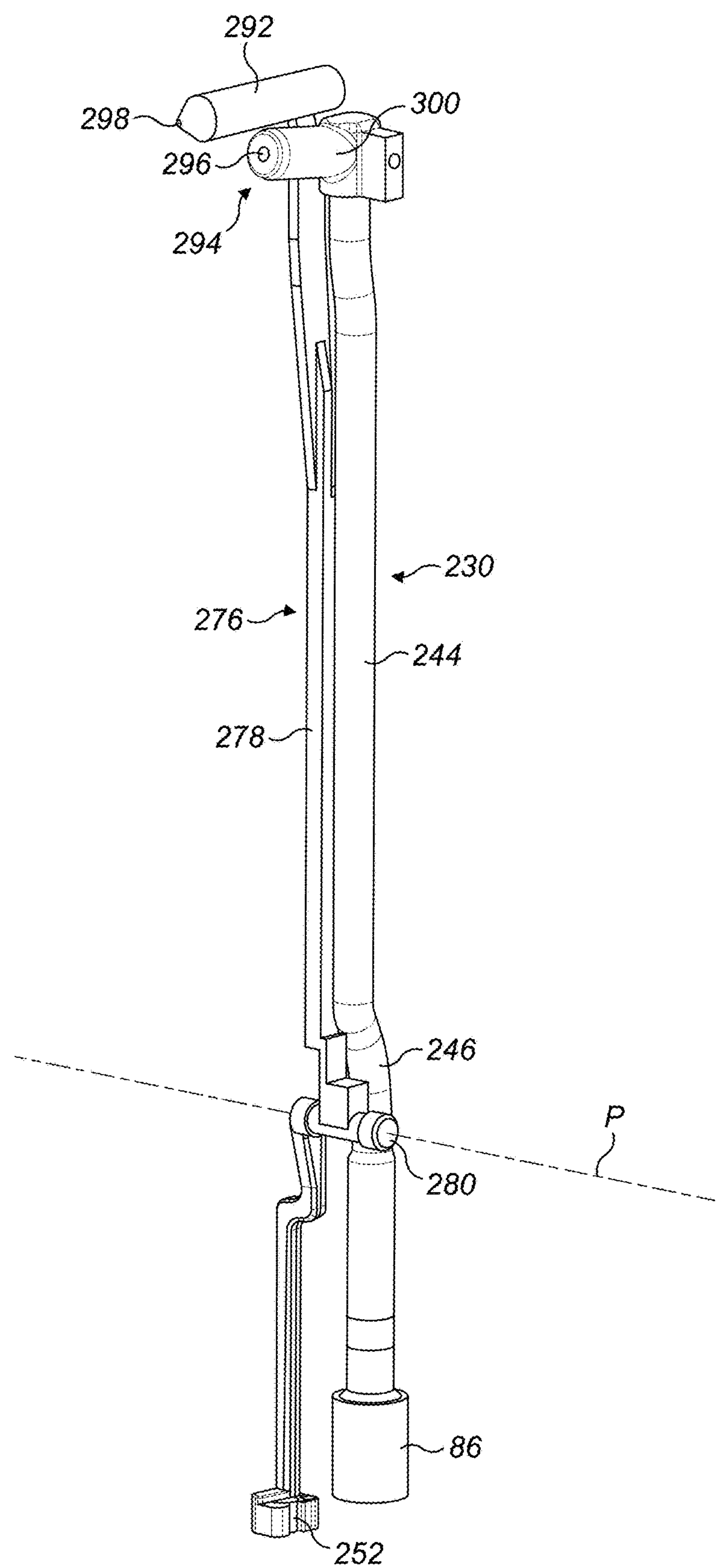
FIG. 25 is a perspective view of the second alternative for the second part of the fluid delivery system which is located in the cleaning tool of the appliance.
Figure 26A:
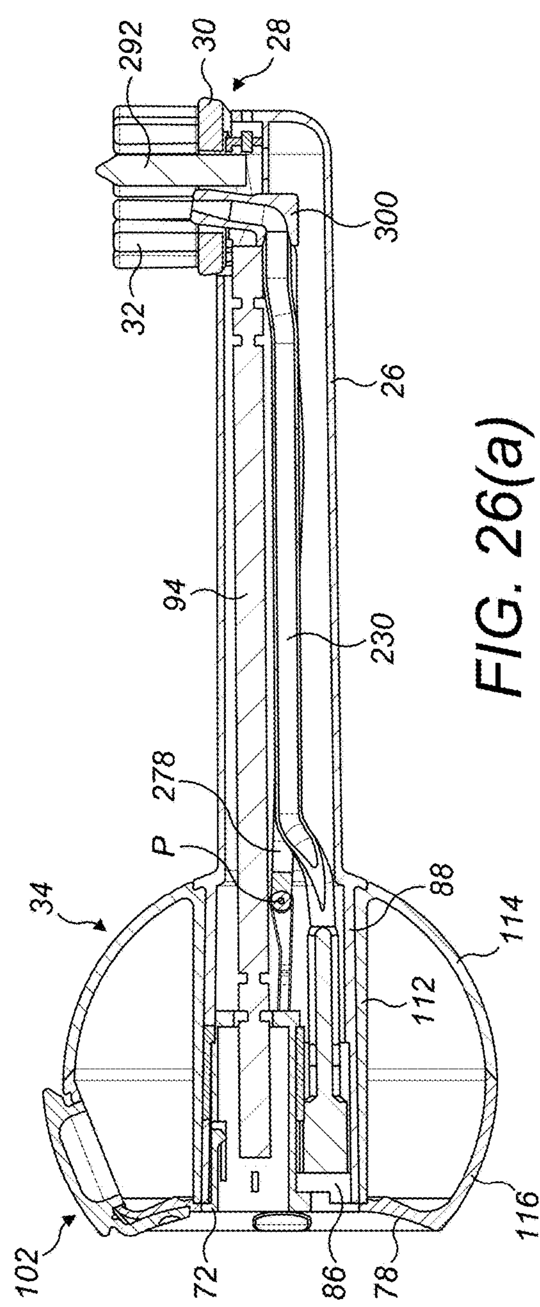
FIG. 26(*a*) is a side view of the position of a cleaning tool comprising the second alternative for the second part of the fluid delivery system, in which a contact member is in a distal position relative to the nozzle, and FIG. 26(*b*) is a similar view to FIG. 26(*a*) with the contact member in a proximal position relative to the nozzle.
Figure 26B:
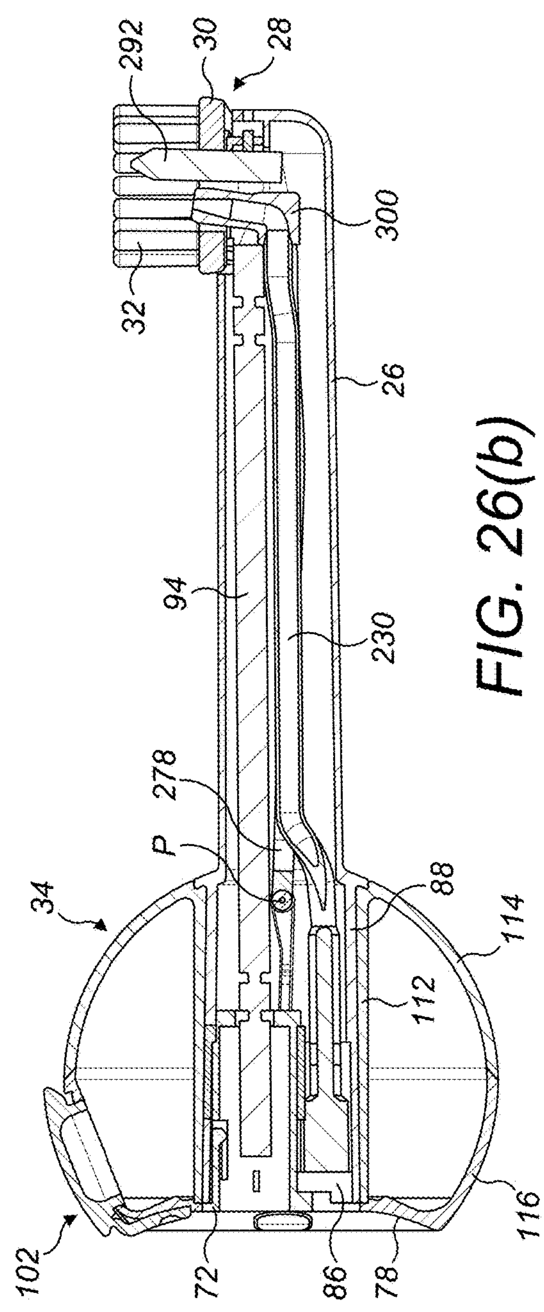

As an alternative to locating the nozzle externally from the bristle carrier 30, both the nozzle and the contact member may be surrounded by the bristle carrier 30. FIG. 24 is a close up of the head of a second alternative cleaning tool 290 for attachment to the handle 12, in which, similar to the first alternative cleaning tool 260, a contact member 292 of the cleaning tool 290 is moveable relative to the nozzle 294 of the cleaning tool 290. However, in this second alternative cleaning tool 290 both the contact member 292 and the nozzle 294 are surrounded by the bristle carrier 30. With reference also to FIGS. 25 and 26, the nozzle 294 is also preferably shaped so that a burst of working fluid ejected from the fluid outlet 296 of the nozzle 294 is directed towards a target area located beyond the tip 298 of the contact member 292. The contact member 292 is substantially the same as the contact member 262 of the first alternative cleaning tool 260, and is supported by the same support 276 as the contact member 262. The third fluid conduit 230 is similarly connected to a fluid inlet of the body 300 of the nozzle 294, but in this embodiment the body 300 of the nozzle 294 is located substantially fully within the stem 26 of the cleaning tool 290. The support 276 is similarly biased for pivoting movement about the pivot axis P of the support 276 by the third fluid conduit 230 so that the contact member 292 is movable between a distal position, as shown in FIG. 26(*a*), and a proximal position, as shown in FIG. 26(*b*), relative to the nozzle 294.

The invention claimed is:

1. A dental cleaning appliance comprising:

a fluid delivery system comprising a nozzle for delivering a burst of working fluid to the teeth of a user;

a contact member for engaging the teeth of the user, the contact member being moveable relative to the nozzle as the appliance is moved along the teeth of the user;

a sensor for providing an output which varies based on movement of the contact member relative to the nozzle; and a control circuit for actuating the delivery of working fluid to the teeth of the user depending on the output from the sensor.

2. The appliance of claim 1, wherein the contact member is biased for movement relative to the nozzle in a direction which urges the contact member against a user's teeth during use of the appliance.

3. The appliance of claim 1, comprising a component connected to the contact member for movement therewith, and wherein the sensor is arranged to provide an output which varies based on movement of the component relative to the nozzle.

4. The appliance of claim 3, wherein the component comprises a magnet.

5. The appliance of claim 4, wherein the sensor is arranged to generate an output which varies depending on the relative positions between the sensor and the magnet.

6. The appliance of claim 4, wherein the sensor is a Hall effect sensor.

7. The appliance of claim 3, comprising an arm connected to the contact member for movement therewith, and wherein the sensor is arranged to provide an output which varies based on movement of the arm relative to the nozzle.

8. The appliance of claim 7, wherein the contact member is located at or towards one end of the arm, and the component is located at or towards the other end of the arm.

9. The appliance of claim 7, wherein the arm is mounted for pivoting movement relative to the nozzle.

10. The appliance of claim 1, comprising a handle, a head and a stem extending between the head and the handle, wherein the head comprises at least one of the contact member and the nozzle, and the handle comprises the sensor.

11. The appliance of claim 10, wherein the contact member is located adjacent to the head.

12. The appliance of claim 10, wherein the nozzle is located adjacent to the head.

13. The appliance of claim 10, wherein the contact member protrudes outwardly from the head beyond the nozzle.

14. The appliance of claim 13, wherein the contact member is located adjacent to the nozzle.

15. The appliance of claim 14, wherein the nozzle defines a bore through which fluid is delivered to the teeth of a user, and wherein part of the contact member is located within the bore.

16. The appliance of claim 15, wherein the contact member is coaxial with the nozzle.

17. The appliance of claim 10, wherein the head and the stem form part of a cleaning tool connected to the handle.

18. The appliance of claim 17, wherein the cleaning tool is detachably connected to the handle.

19. The appliance of claim 1, wherein the sensor is located adjacent to the contact member.

20. The appliance of claim 19, wherein the contact member comprises a base and a tip for engaging the teeth of the user, and wherein the sensor is located adjacent to the base of the contact member.

21. The appliance of claim 20, wherein the sensor is arranged to generate an output which varies depending on the relative positions between the sensor and the base of the contact member.

22. The appliance of claim 19, comprising a handle, a head and a stem extending between the head and the handle, wherein the head comprises the contact member, the nozzle and the sensor.

23. The appliance of claim 22, wherein the contact member is moveable relative to the head.

24. The appliance of claim 23, wherein the contact member is biased for movement relative to the head in a direction extending away from the head.

25. The appliance of claim 24, wherein the contact member is biased for movement relative to the head in a direction extending substantially normal to a longitudinal axis of the stem.

26. The appliance of claim 23, wherein the contact member is moveable relative to the head between a distal position and a proximal position.

27. The appliance of claim 26, wherein the control circuit is configured to actuate the delivery of working fluid to the teeth of the user in response to movement of the contact member to or from the distal position.

28. The appliance of claim 23, wherein the head comprises means for engaging the teeth of the user during use of the appliance, and wherein the contact member is moveable relative to the engaging means.

29. The appliance of claim 28, wherein the engaging means is formed from resilient material.

30. The appliance of claim 29, wherein the engaging means comprises a plurality of resilient members arranged around at least one of the nozzle and the contact member.

31. The appliance of claim 29, wherein the engaging means comprises a plurality of bristles arranged around at least one of the nozzle and the contact member.

32. The appliance of claim 31, wherein the bristles are mounted on a bristle carrier which is moveable relative to the nozzle.

33. The appliance of claim 1, wherein the control circuit is configured to actuate the delivery of working fluid to the teeth of the user depending on the rate of change of the output from the sensor.

34. The appliance of claim 1, wherein the fluid delivery system comprises a pump, and the control circuit is configured to operate the pump depending on the output from the sensor.

35. The appliance of claim 1, wherein the working fluid is a liquid working fluid.

36. The appliance of claim 1, comprising a fluid reservoir for supplying working fluid to the fluid delivery system.

37. The appliance of claim 36, wherein the fluid reservoir is refillable.

* * * * *